(12) United States Patent
Kawai et al.

(10) Patent No.: US 10,564,693 B2
(45) Date of Patent: Feb. 18, 2020

(54) INFORMATION PROCESSING SYSTEM, INFORMATION PROCESSING APPARATUS, INFORMATION PROCESSING PROGRAM, AND METHOD OF CONTROLLING OPERATION MODE

(71) Applicant: NINTENDO CO., LTD., Kyoto (JP)

(72) Inventors: Yozo Kawai, Kyoto (JP); Munehito Oira, Kyoto (JP); Shumpei Yasuda, Kyoto (JP); Yu Horii, Kyoto (JP); Takahiro Fukuda, Kyoto (JP); David Tran, Redmond, WA (US); Eugene Borisov, Redmond, WA (US); Joel Hopkins, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 392 days.

(21) Appl. No.: 14/353,151

(22) PCT Filed: Jul. 10, 2013

(86) PCT No.: PCT/JP2013/068892
§ 371 (c)(1),
(2) Date: Apr. 21, 2014

(87) PCT Pub. No.: WO2015/004756
PCT Pub. Date: Jan. 15, 2015

(65) Prior Publication Data
US 2015/0192975 A1 Jul. 9, 2015

(51) Int. Cl.
*G06F 1/3203* (2019.01)
*G06F 1/32* (2019.01)
*G06F 11/00* (2006.01)

(52) U.S. Cl.
CPC .............. *G06F 1/3203* (2013.01); *G06F 1/32* (2013.01); *G06F 11/00* (2013.01)

(58) Field of Classification Search
CPC ... G06F 21/51; G06F 1/32; G06F 8/65; G06F 9/445; G06F 17/30345; G06F 21/554;
(Continued)

(56) References Cited

U.S. PATENT DOCUMENTS 6,134,584 A * 10/2000 Chang ................... G06F 16/957
709/219
8,645,736 B1 * 2/2014 Tabone .................. G06F 1/329
713/323
(Continued)

FOREIGN PATENT DOCUMENTS

| JP | 2005-57428 | 3/2005 |
| JP | 2005-234651 | 9/2005 |

(Continued)

OTHER PUBLICATIONS

Office Action dated May 15, 2018 issued in JP 2017-194460 (5 pgs.).

(Continued)

*Primary Examiner* — Jaweed A Abbaszadeh
*Assistant Examiner* — Brian J Corcoran
(74) *Attorney, Agent, or Firm* — Nixon & Vanderhye PC

(57) ABSTRACT

An information processing system is capable of communicating with an external apparatus via a network. The information processing system is capable of operating in at least three operation modes including: a first mode; a second mode, which consumes less power than the first mode; and a third mode, which consumes less power than the second mode and where the communication via the network is not performed. The information processing system includes a mode control section and a second mode processing section. The mode control section, when the information processing system operates in the third mode, shifts the operation mode to the second mode periodically or in accordance with a (Continued)

predetermined time schedule. The second mode processing section performs a communication process via the network as information processing in the second mode.

5 Claims, 17 Drawing Sheets

(58) Field of Classification Search
CPC ............... G06F 3/0481; G06F 3/04845; G06F 3/04817; G06F 2221/2151; G06F 11/1433; G06F 3/123; G06F 1/3287; G06F 1/3203; G06F 1/3234; G06F 1/329; G06F 1/3293; G06F 8/61
See application file for complete search history.

(56) References Cited

U.S. PATENT DOCUMENTS

| | | | |
|---|---|---|---|
| 9,292,071 B2* | 3/2016 | Kaneko | G04G 15/00 |
| 9,313,315 B2* | 4/2016 | Choi | H04M 1/7253 |
| 9,554,330 B2 | 1/2017 | Aust et al. | |
| 2006/0069769 A1* | 3/2006 | Dacosta | H04L 29/06027 709/224 |
| 2006/0150020 A1* | 7/2006 | Lee | G06F 1/3203 714/36 |
| 2007/0113107 A1* | 5/2007 | Ohara | G11B 33/144 713/300 |
| 2007/0266265 A1 | 11/2007 | Zmudzinski et al. | |
| 2010/0023788 A1* | 1/2010 | Scott | G06F 1/3209 713/320 |
| 2010/0185833 A1* | 7/2010 | Saito | G06F 1/3203 712/203 |
| 2010/0229168 A1 | 9/2010 | Maeda et al. | |
| 2010/0254293 A1* | 10/2010 | Son | H04W 52/0216 370/311 |
| 2011/0134474 A1 | 6/2011 | Yamada et al. | |
| 2011/0145808 A1* | 6/2011 | Mountain | G06F 1/3203 717/171 |
| 2012/0005501 A1* | 1/2012 | Maciocco | H04W 52/0206 713/320 |
| 2012/0221637 A1 | 8/2012 | Adachi | |
| 2012/0239955 A1* | 9/2012 | Yanase | G06F 1/1624 713/323 |
| 2012/0311596 A1 | 12/2012 | Imai et al. | |
| 2013/0013948 A1* | 1/2013 | Sengupta | G06F 1/3209 713/323 |
| 2013/0111408 A1* | 5/2013 | Berus | G06Q 10/10 715/835 |
| 2013/0139138 A1* | 5/2013 | Kakos | G06F 8/65 717/168 |
| 2014/0025974 A1* | 1/2014 | Suwabe | G06F 1/3234 713/323 |
| 2014/0189404 A1* | 7/2014 | Sur | G06F 1/3234 713/323 |
| 2014/0237593 A1* | 8/2014 | Chen | G06F 21/51 726/22 |
| 2015/0199058 A1* | 7/2015 | Zhang | G06F 21/82 345/173 |

FOREIGN PATENT DOCUMENTS

| | | |
|---|---|---|
| JP | 2008-125614 | 6/2008 |
| JP | 2010-245692 | 10/2010 |
| JP | 2011-124626 | 6/2011 |
| JP | 2012-178733 | 9/2012 |
| JP | 2012-221158 | 11/2012 |
| JP | 2012-253617 | 12/2012 |
| WO | 2009/004757 | 8/2010 |
| WO | 2013/076945 | 5/2013 |

OTHER PUBLICATIONS

Office Action—Decision of Refusal dated Oct. 12, 2018 issued in JP Application No. 2017-194460 (4 pages).

\* cited by examiner

| | OPERATION MODE | | |
|---|---|---|---|
| | FULL MODE | ECO MODE | OFF MODE |
| FIRST PROCESSING UNIT | ○ | × | × |
| SECOND PROCESSING UNIT | ○ | △ (OPERATION CLOCK: LOW) | × |
| POWER SOURCE CONTROL UNIT | ○ | ○ | ○ |
| COMMUNICATION SECTION | ○ | ○ | × |
| INPUT RECEPTION SECTION | ○ | ○ | ○ |
| DISPLAY SECTION | ○ | × | × |
| STORAGE SECTION | ○ | ○ | × |
| COOLING FAN | ○ | △ (LOW-SPEED ROTATION) | × |
| ADDITIONAL STORAGE DEVICE | ○ | △ (UNDER CERTAIN CONDITIONS) | × |

F I G. 2 0
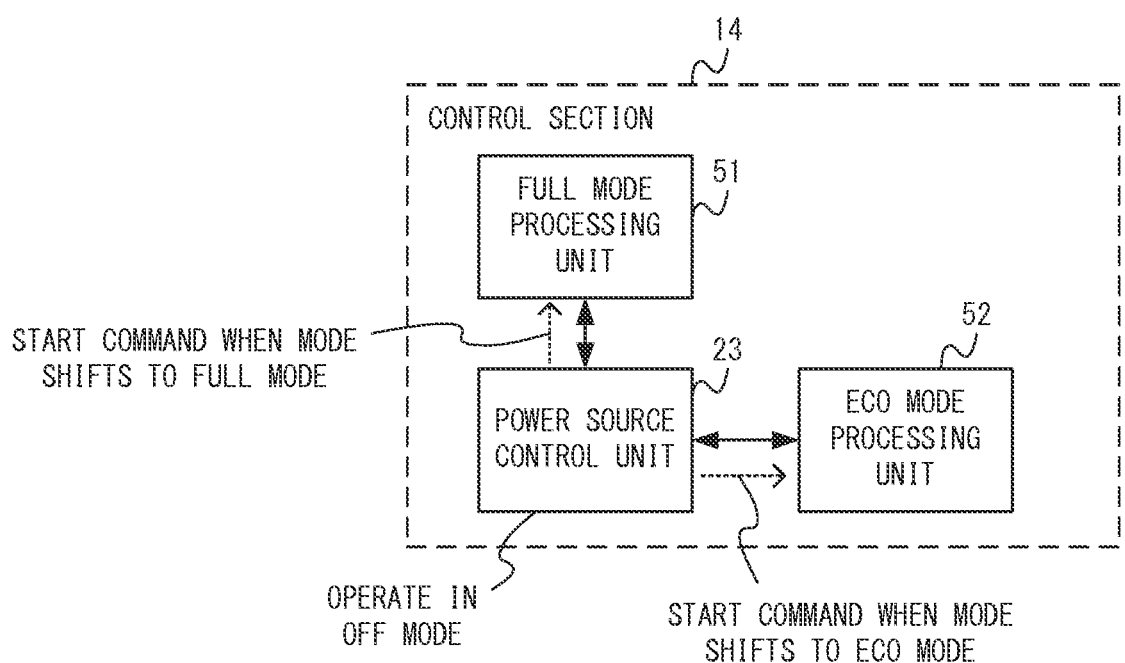

INFORMATION PROCESSING SYSTEM, INFORMATION PROCESSING APPARATUS, INFORMATION PROCESSING PROGRAM, AND METHOD OF CONTROLLING OPERATION MODE

This application is the U.S. national phase of International Application No. PCT/JP2013/068892, filed 10 Jul. 2013, the entire contents of which is hereby incorporated by reference.

TECHNICAL FIELD

The present invention relates to an information processing system and an information processing apparatus that are capable of operating in a plurality of operation modes, an information processing program to be executed in the information processing system, and a method of controlling operation modes.

BACKGROUND ART

Conventionally, an information processing apparatus capable of executing an application communicates with an external apparatus in a period in which a user is not using the information processing apparatus (an application is not executed). For example, in the above period, the information processing apparatus transmits and receives a message to and from the external apparatus (see Patent Literature 1, for example). Further, in the above period, the supply of power to some circuit of the information processing apparatus is stopped, thereby reducing the power consumption.

CITATION LIST

Patent Literature

[Patent Literature 1] Japanese Laid-Open Patent Publication No. 2008-125614

SUMMARY OF THE INVENTION

Problems to be Solved by the Invention

An information processing apparatus is required to save more power.

Therefore, it is an object of the present invention to provide an information processing system, an information processing apparatus, an information processing program, and a method of controlling operation modes that are capable of saving power.

Solution to the Problems

To achieve the above object, the present invention employs the following configurations (1) to (28).

(1)

The present specification discloses an information processing system capable of communicating with an external apparatus via a network. The information processing system is capable of operating in at least three operation modes including: a first mode; a second mode, which consumes less power than the first mode; and a third mode, which consumes less power than the second mode and where the communication via the network is not performed. The information processing system includes a mode control section and a second mode processing section. The mode control section, when the information processing system operates in the third mode, shifts the operation mode to the second mode periodically or in accordance with a predetermined time schedule. The second mode processing section performs a communication process via the network as information processing in the second mode.

(2)

Further, the present specification discloses an information processing system capable of communicating with an external apparatus via a network. The information processing system is capable of operating in at least three operation modes including: (a) a first mode, where at least a first processing unit configured to execute an application in accordance with an operation of a user starts; (b) a second mode, which consumes less power than the first mode and where the first processing unit does not start, and a second processing unit configured to automatically perform a communication process via the network starts; and (c) a third mode, where the first processing unit and the second processing unit do not start, and a power source control unit configured to measure time and control the start of the second processing unit based on the measured time starts. The information processing system includes a mode control section and a second mode processing section. The mode control section, when the information processing system operates in the third mode, shifts the operation mode to the second mode periodically or in accordance with a predetermined time schedule. The second mode processing section causes the second processing unit to perform a communication process via the network as information processing in the second mode.

It should be noted that in the above (1) and (2), the wording "shift the operation mode to the second mode periodically or in accordance with a predetermined time schedule" means that the operation mode may shift to the second mode periodically, or the operation mode may shift to the second mode in accordance with a predetermined time schedule. That is, the above wording means that a form is included in which the operation mode shifts to the second mode periodically and in accordance with the predetermined time schedule.

According to the above configurations (1) and (2), in a period in which a user does not use the information processing system (a period other than the first mode), information processing (a communication process) is performed in the second mode, and while the information processing is not performed, the information processing system is in the state where less power is consumed (the third mode). This makes it possible to reduce the power consumption in the above period, and save power in the information processing system.

(3)

In accordance with the fact that the information processing has ended in the second mode, the mode control section may shift the operation mode to the third mode.

According to the above configuration (3), it is possible to quickly shift from the second mode to the third mode, and save power in the information processing system.

(4)

The first mode may be a mode where software can be executed in accordance with an instruction from the user. The second mode may be a mode where, as the information processing, software can be added and/or updated using data acquired from the external apparatus via the network. The third mode may be a mode where the software is not executed, added, or updated.

According to the above configuration (4), it is possible to allow the user to use software in the first mode, and also automatically update and/or add the software in a period when the software is not used (a period other than the first mode).

(5)

In the second mode, the second mode processing section may acquire, via the network, data for updating and/or adding software executable by the information processing system.

According to the above configuration (5), it is possible to update and/or add software during the second mode (while the user is not aware of it).

(6)

The information processing system may further include an application information storage section configured to store application information indicating an application executable by the information processing system. The second mode processing section may acquire data regarding the application indicated by the application information.

According to the above configuration (6), the information processing system can certainly acquire data regarding an executable application from an external apparatus.

(7)

In the second mode, the second mode processing section may perform information processing for acquiring a new application from the external apparatus via the network and installing the acquired new application.

According to the above configuration (7), the installation of a new application during the second mode makes it possible to reduce the burden of the processing performed during the first mode. Further, the information processing system can provide a new application without the user's knowledge.

(8)

In the initial second mode after an end of the first mode, the second mode processing section may perform at least a predetermined setting process, and in the second mode after the setting process has been completed, the second mode processing section may perform information processing related to the setting process.

According to the above configuration (8), the setting process may be performed in the initial second mode, and another type of information processing may be performed in the second mode thereafter. This makes it possible to efficiently perform the process in the second mode.

(9)

Based on a processing result of the setting process, the second mode processing section may perform an operation in the second mode after the setting process has been completed.

According to the above configuration (9), it is possible to set the operation in the second mode every time the first mode ends, and therefore to perform the second mode by an appropriate operation based on the situation.

(10)

The second mode processing section may perform as the setting process a process of acquiring information to be used in the information processing to be performed in the second mode after the setting process has been completed.

According to the above configuration (10), it is possible to simplify information processing to be performed after the setting process.

(11)

If, in the initial second mode after the end of the first mode, it has been determined that the information processing cannot be performed based on the processing result of the setting process, the second mode processing section may perform the setting process again in the next second mode.

According to the above configuration (11), it is possible to acquire the processing result of the setting process more certainly.

(12)

The mode control section may shift the operation mode of the information processing system from the first mode to the third mode, and may then shift the operation mode from the third mode to the second mode periodically or in accordance with a predetermined time schedule.

According to the above configuration (12), even if the user has performed work that may have an adverse influence on the process in the second mode after the end of the first mode, it is possible to reduce the possibility that the work is performed during the second mode. As a result, it is possible to increase the possibility that the process during the second mode is properly performed.

(13)

The mode control section may set a time interval between the end of the first mode and the shift to the initial second mode to be shorter than a time interval between the second mode and the next second mode.

According to the above configuration (13), it is possible to quickly start the initial second mode after the end of the first mode, and repeatedly start the second mode at an appropriate frequency thereafter.

(14)

Based on an instruction given by the user in the first mode before the operation mode shifts to the third mode, the mode control section may determine timing of shifting to the second mode when the information processing system operates in the third mode.

In the above configuration (14), as the "timing of shifting to the second mode", for example, the time interval between the second mode and the next second mode, the time when the second mode is started, or the like is determined by an instruction from the user.

According to the above configuration (14), it is possible to set the time interval between eco modes in accordance with the user's convenience.

(15)

In the second mode, the second mode processing section may acquire, via the network, shift time information indicating a time when the operation mode shifts to the second mode next. After the shift time information has been acquired, the mode control section may determine based on the shift time information a time when the third mode shifts to the second mode next.

According to the above configuration (15), it is possible to manage the time interval between the second modes on the external apparatus side.

(16)

The information processing system may further include a storage device control section configured to, in the second mode, determine based on a storage content, acquired in advance, of a storage device accessible by the information processing system whether or not to start the storage device.

According to the above configuration (16), it is possible to provide an opportunity where the storage device is not started depending on the storage content of the storage device. This makes it possible to reduce the power consumption during the second mode.

(17)

The information processing system may be allowed to be connected to an additional storage device. In this case, in the second mode, the storage device control section may determine based on a storage content of the additional storage device acquired in advance whether or not to start the additional storage device.

According to the above configuration (17), it is possible to provide an opportunity where an additional storage device is not started depending on the storage content of the additional storage device. This makes it possible to reduce the power consumption during the second mode.

(18)

In the initial second mode after the end of the first mode, the second mode processing section may acquire the storage content of the additional storage device.

According to the above configuration (18), the information processing system can acquire the storage content at the end of the first mode and can accurately determine whether or not to start the additional storage device.

(19)

The information processing system may be allowed to be connected to an additional device. The second mode processing section may acquire data from the external apparatus via the network and determines whether or not it is necessary to access the additional device for a process regarding the acquired data. The information processing system may further include an additional device control section configured to, based on a result of the determination of whether or not it is necessary to access the additional device, determine whether or not to start the additional device.

According to the above configuration (19), it is possible to provide an opportunity where an additional device is not started, taking into account the presence or absence of access to the additional device. This makes it possible to reduce the power consumption during the second mode.

(20)

The information processing system may further include an application execution section configured to, in the first mode, execute an application in accordance with an instruction from the user. In this case, the second mode processing section, if a predetermined condition has been satisfied in the first mode, may perform the information processing, and at least if the application is being executed, may perform the information processing in a background.

According to the above configuration (20), even if information processing in the second mode is performed in the first mode, it is possible to perform the information processing without making the user aware of it.

(21)

In accordance with the fact that a predetermined condition has been satisfied in the second mode, the mode control section may shift the operation mode of the information processing system to the first mode. If the operation mode has shifted to the first mode while the information processing in the second mode was being performed, the second mode processing section may continuously perform in the first mode the information processing that was being performed.

According to the above configuration (21), even if the operation mode has shifted to the first mode during the second mode, it is possible to complete the information processing in the second mode without wasting the processing performed during the second mode.

(22)

In the second mode, the second mode processing section may be allowed to perform a first process and a second process in parallel. In this case, the second mode processing section may repeatedly perform the second process in the second mode and may end the second mode at least under the condition that the first process has been completed.

According to the above configuration (22), it is possible to certainly complete the first process during the second mode, and also perform the second process at an appropriate frequency.

(23)

In the third mode, in accordance with the fact that a predetermined condition different from a condition for shifting to the second mode has been satisfied, the mode control section may shift the operation mode to the first mode.

According to the above configuration (23), it is possible to shift the operation mode to the first mode even during the third mode.

(24)

In the third mode, under the condition that predetermined timing that periodically arrives or timing based on a predetermined time schedule has come, the mode control section may shift the operation mode to the second mode, and under the condition that a start instruction has been given by the user, the mode control section may shift the operation mode to the first mode.

According to the above configuration (24), it is possible to, in the third mode, shift to the second mode periodically (or in accordance with the predetermined time schedule), and also shift to the first mode at timing desired by the user.

(25)

The mode control section may include a first processing circuit, which is a circuit capable of measuring time and operates in the third mode. The second mode processing section may further include a second processing circuit, which is a circuit for performing the information processing in the second mode, operates in the second mode, and does not operate in the third mode. If the processing in the second mode has been completed, the second processing circuit may notify the first processing circuit of time information for shifting to the second mode next, and may halt. In the third mode, if the measured time has reached a time indicated by the time information notified by the second processing circuit, the first processing circuit may start the second processing circuit, thereby shifting from the third mode to the second mode.

According to the above configuration (25), it is possible to, in the third mode, halt the second processing circuit for performing the process in the second mode, and save power. Further, it is possible to easily manage the start time of the second mode by the second processing circuit for performing the process in the second mode.

(26)

The information processing system may further include: a cooling fan configured to cool an information processing section in the information processing system; and a fan control section. The fan control section, in the second mode, drives the cooling fan at a lower rotation speed than in the first mode.

According to the above configuration (26), it is possible to reduce the operating sound of the information processing system in the second mode, and also save power.

(27)

The information processing system may further include a timer circuit configured to operate in the third mode and capable of measuring time. The mode control section may manage the time schedule using the timer circuit.

According to the above configuration (27), the timer circuit may start in the third mode, and it is possible to halt other circuits where necessary. This makes it possible to manage the time schedule while saving power.

(28)

The information processing system may further include a mode display section configured to display at least the second mode and the third mode so as to be distinguishable from each other.

According to the above configuration (28), it is possible to notify the user of whether the information processing system is in the second mode or the second mode.

It should be noted that another example of the present invention may be an information processing apparatus including means equivalent to the components of the information processing system in the above (1) to (28), or may be an information processing program for causing a computer of an information processing apparatus to function as means equivalent to the components of the information processing system in the above (1) to (28). Further, yet another example of the present invention may be a method of controlling an operation mode to be performed by the information processing system in the above (1) to (28).

Advantageous Effects of the Invention

According to the present invention, it is possible to reduce the power consumption in a period in which a user does not use an information processing system, and to save power in the information processing system.

BRIEF DESCRIPTION OF THE DRAWINGS

FIG. 20 is a diagram showing an example of a variation of the configuration of the control section.

DESCRIPTION OF EMBODIMENTS

[1. Configuration of Information Processing System]

Figure 1:
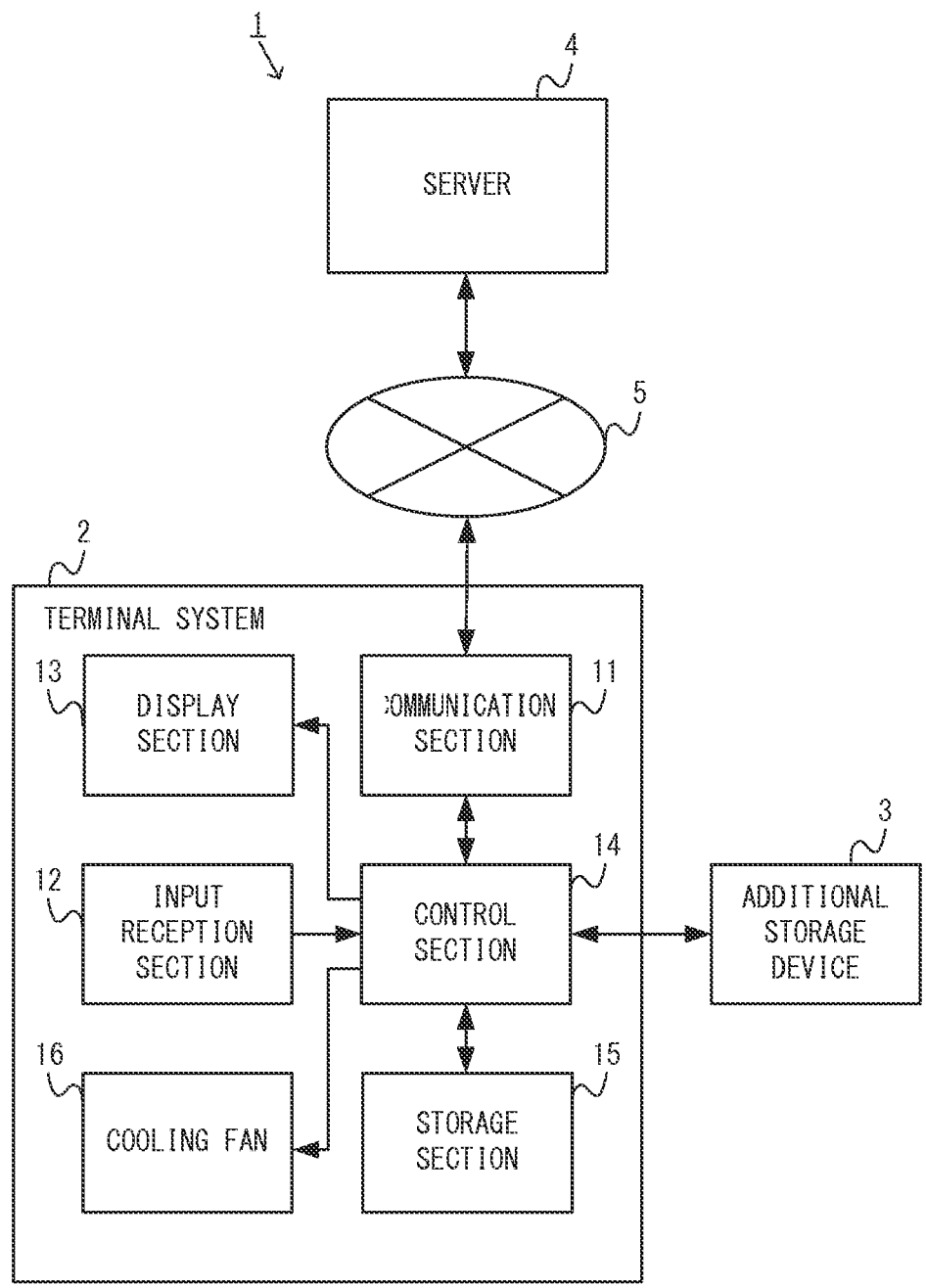
FIG. 1 is a block diagram showing an example of the configuration of a communication system 1.

A description is given below of an information processing system, an information processing apparatus, an information processing program, and a method of controlling operation modes, according to an example of the present embodiment. First, the configuration of the information processing system is described. FIG. 1 is a block diagram showing an example of the configuration of a communication system. As shown in FIG. 1, a communication system 1 includes a terminal system 2, an additional storage device 3, a server 4, and a network 5. The terminal system 2 can communicate with the server 4 via the network 5.

The terminal system 2 is an example of an information processing apparatus (an information processing system) capable of executing an application. The terminal system 2 includes a communication section 11. The communication section 11 transmits and receives data to and from the server 4 via the network 5. Further, the terminal system 2 includes an input reception section 12. The input reception section 12 is any input device that receives an input from a user, such as a button (a key), a touch panel, and/or a mouse. Further, the terminal system 2 includes a display section 13. The display section 13 includes a display device that displays an image generated by information processing performed in the terminal system 2. It should be noted that the terminal system 2 may not include the display section 13, and may be configured to use, for example, a television as a display device. Further, the display section 13 includes a light-emitting section (specifically, an LED) provided in the terminal system 2. Although described in detail later, the light-emitting section is used to display the operation mode of the terminal system 2.

The terminal system 2 includes a control section 14. The control section 14 performs various types of information processing to be performed in the terminal system 2. The control section 14 includes a CPU (Central Processing Unit) and a memory. The CPU executes a predetermined information processing program using the memory, thereby performing the various types of information processing. It should be noted that the detailed configuration of the control section 14 will be described later (see FIG. 2).

The terminal system 2 includes a storage section 15. The storage section 15 is any storage device (storage medium) included in an information processing apparatus of the terminal system 2. The storage section 15 is a storage device, such as a memory and/or a hard disk, built into the information processing apparatus. In the present embodiment, the storage section 15 stores software executable by the terminal system 2. Specifically, the storage section 15 stores system software, such as an OS (operating system), and an application. The application may be any type of application, such as a game application, for example.

The terminal system 2 includes a cooling fan 16, which cools the control section 14 (the CPU). In the present embodiment, the cooling fan 16 can be driven at at least two levels of rotation speed. The rotation speed of the cooling fan 16 is controlled by the control section 14.

The additional storage device 3 is a storage device accessible by the terminal system 2 (the control section 14). In the present embodiment, the additional storage device 3 is a disk storage device such as a hard disk drive, for example. Further, the additional storage device 3 is attachable to and detachable from the terminal system 2. The additional storage device 3 stores an application executable by the terminal system 2. It should be noted that the terminal system 2 may be detachably connected to another type of additional device (an input device such as a keyboard, for example) other than a storage device.

As described above, the terminal system 2 can execute software stored in the storage section 15 of the terminal system 2, and can also execute an application stored in the additional storage device 3. It should be noted that the software may be provided to the terminal system 2 by any method. As will be described later, the software may be provided to the terminal system 2 from the server 4, or may be provided to the terminal system 2 by a portable storage medium (an optical disk, for example) readable by the terminal system 2.

The terminal system 2 is composed of one or more information processing apparatuses. The terminal system 2 may be composed of a single information processing apparatus (a handheld information processing apparatus, for example), or may be configured to include a main information processing apparatus that performs main information processing, and a terminal apparatus including an input device and a display device. Alternatively, in another embodiment, at least part of the information processing performed in the terminal system 2 may be performed in a distributed manner by a plurality of apparatuses capable of communicating with each other via a network (a wide-area network and/or a local network).

The server 4 is an example of an external apparatus capable of communicating with the terminal system 2 via the network. In the present embodiment, the server 4 provides data regarding software (the system software and the application described above) executable by the terminal system 2. That is, the server 4 stores the software per se and update data (a patch, for example) regarding the software, and provides the software and the update data to the terminal system 2 where necessary. It should be noted that the server 4 may be a server (a shop server, for example) for performing a service for providing an application.

The server 4 is composed of one or more information processing apparatuses (server apparatuses). For example, a server apparatus may be provided for each type of software (application). If the server is thus composed of a plurality of server apparatuses, the entire group of server apparatuses is referred to as a "server".

Figure 2:
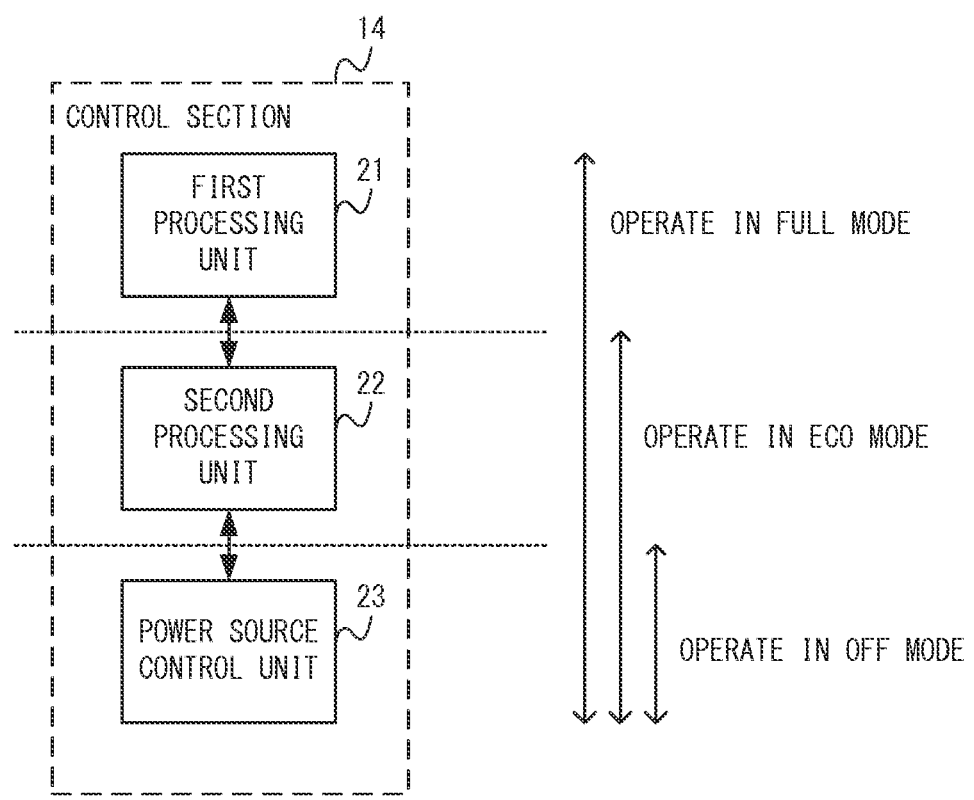
FIG. 2 is a block diagram showing an example of the configuration of a control section 14.

FIG. 2 is a block diagram showing an example of the configuration of the control section 14. As shown in FIG. 2, the control section 14 includes a first processing unit 21, a second processing unit 22, and a power source control unit 23. In the present embodiment, the units 21 to 23 are configured as separate circuits. The terminal system 2 can separately control the supply of power to the units 21 to 23. Although described in detail later, in the present embodiment, the terminal system 2 can operate in a plurality of operation modes, and the unit to operate among the units 21 to 23 varies in each operation mode.

The first processing unit 21 includes a CPU and executes an application using the CPU. In the present embodiment, the first processing unit 21 is an information processing circuit for executing an application. In the present embodiment, the first processing unit 21 can be supplied with power and operate in a full mode described later.

The second processing unit 22 includes a CPU and performs the entire processing of the terminal system 2 except for the process of executing an individual application, using the CPU. Specifically, the second processing unit 22 executes the system software and performs the process of communicating with the server 4. Further, in the present embodiment, the second processing unit 22 includes a GPU and performs the process of generating an image based on an application in accordance with the execution of the application by the first processing unit 21. In the present embodiment, the second processing unit 22 can be supplied with power and operate in a full mode and an eco mode described later.

The power source control unit 23 includes an RTC (Real Time Clock) and measures time. Although described in detail later, to change the operation mode of the terminal system 2 in accordance with a predetermined time schedule, the time measured by the power source control unit 23 is used. Further, the power source control unit 23 controls the supply of power to all the components of the terminal system 2. For example, the power source control unit 23 controls the start of the second processing unit 22 based on the measured time. Further, in the present embodiment, the power source control unit 23 can be supplied with power and operate in all operation modes, namely a full mode, an eco mode, and an off mode.

In the present embodiment, (all the components of) the terminal system 2 operates with the power acquired from an external power source. The power source control unit 23 supplies the power from the external power source to all the components of the terminal system 2. For example, the terminal system 2 may acquire power from a home power supply via an AC adapter (not shown). Alternatively, in another embodiment, the terminal system 2 may operate with the power acquired from an internal power source (a battery or the like included in the terminal system 2).

[2. Operation Mode of Terminal System 2]

Figures 3, 4:
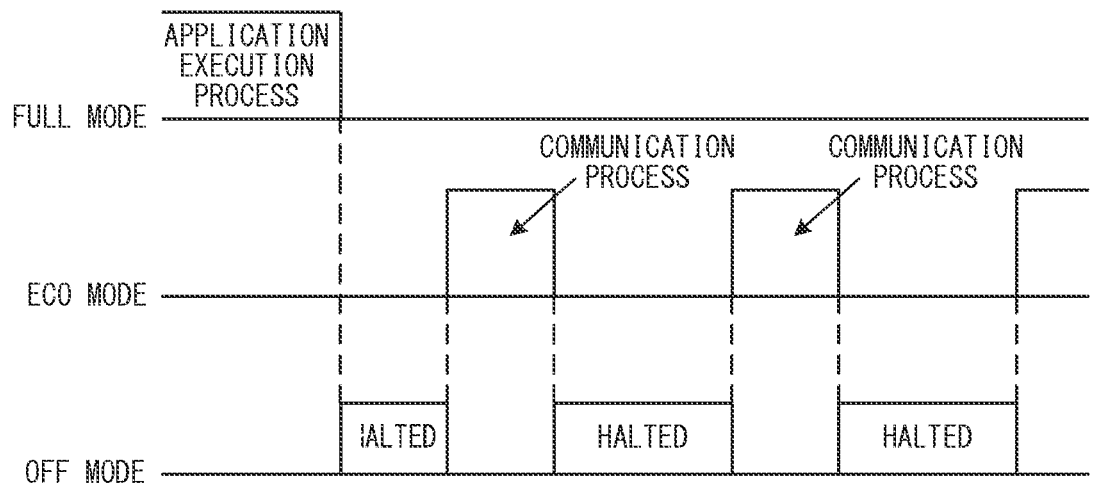
FIG. 3 is a diagram showing an example of the presence or absence of the supply of power to each component of a terminal system 2 with respect to each mode.
FIG. 4 is a diagram showing an example of the operation in which an eco mode is intermittently started.

Next, the operation mode of the terminal system 2 is described. In the present embodiment, the terminal system 2 operates in three operation modes, namely a full mode, an eco mode, and an off mode. FIG. 3 is a diagram showing an example of the presence or absence of the supply of power to each component of the terminal system 2 with respect to each mode. As is clear from FIG. 3, the three operation modes are different from one another in terms of the power consumption of the terminal system 2. The terminal system 2 operates by appropriately switching between the three operation modes, thereby saving power. Each mode is described below.

It should be noted that in the present embodiment, "the power consumption of the terminal system 2" means, if the terminal system 2 is composed of a single information processing apparatus, the power consumption of the information processing apparatus. If, on the other hand, the terminal system 2 is composed of a plurality of apparatuses, "the power consumption of the terminal system 2" means the power consumption of the apparatus that performs information processing in the terminal system 2 (the information processing apparatus including the control section 14).

(2-1: Full Mode)

The full mode is a mode used when the user uses the terminal system 2 (uses an application). As shown in FIG. 3, in the full mode, power is supplied to all the components of the terminal system 2 and the additional storage device 3. The full mode is a mode that consumes the most power among the three operation modes. In the full mode, however, not all the functions of the terminal system 2 need to be able to be performed. For example, in another embodiment, the functions of the terminal system 2 may include a function that is not performed in the full mode (a function that is performed only in the eco mode or the off mode).

In the full mode, a normal operation for the user to use the terminal system 2 is performed. For example, the terminal system 2 causes a menu screen to be displayed on the display section 13, and in accordance with the fact that the user has specified an application on the menu screen, executes the application. In the full mode, the second processing unit 22 executes the system software, and the first processing unit 21 executes an application in accordance with an instruction from the user. Further, the communication section 11, the input reception section 12, the display section 13, and the storage section 15 perform appropriate operations for the normal operation. The cooling fan 16 operates at a normal rotation speed. Further, the terminal system 2 starts the additional storage device 3. As described above, the full mode is a mode where software (an application) can be executed in accordance with an instruction from the user. The full mode can be said to be an application execution mode.

(2-2: Eco Mode)

The eco mode is a mode used when software (an application) is added and/or updated while the user is not using the terminal system 2 (is not using an application). As shown in FIG. 3, in the eco mode, power is supplied to the second processing unit 22 and the power source control unit 23 among the units 21 to 23 of the control section 14. Further, power is supplied to the communication section 11, the input reception section 12, the storage section 15, the cooling fan 16, and the additional storage device 3. As described above, the eco mode is a mode where among all the components of the terminal system 2, fewer members operate (power is supplied to fewer members) than in the full mode. The eco mode is a mode that consumes less power than the full mode.

In the present embodiment, in the eco mode, the second processing unit 22 (automatically) performs the process of communicating with the server 4, and software is added and/or updated. As described above, the eco mode is a mode where software can be added and/or updated using data acquired from the server 4. In the present embodiment, the eco mode can be said to be a software update mode.

It should be noted that the process performed in the eco mode is not limited to the above communication process, and may be any process. Further, the process performed in the eco mode may be performed also in the full mode, or may be a process that is not performed in the full mode.

In the present embodiment, the functions of the second processing unit 22 in the eco mode are more limited than in the full mode. That is, in the eco mode, the supply of power to some circuit (the GPU, for example) of the second processing unit 22 is stopped. Further, the CPU of the second processing unit 22 is controlled to operate at a lower operating frequency (clock frequency) in the eco mode than in the full mode. This makes the power consumption of the second processing unit 22 in the eco mode smaller than the power consumption of the second processing unit 22 in the full mode. It should be noted that in another embodiment, the operating frequency of the CPU of the second processing unit 22 is any operating frequency, and may be the same in both the eco mode and the full mode.

Further, in the eco mode, the terminal system 2 drives the cooling fan 16 at a lower rotation speed than in the full mode. This makes it possible to reduce the operating sound of the terminal system 2 in the eco mode, and also save power. It should be noted that the rotation speed of the cooling fan 16 in the eco mode is any rotation speed, and in the present embodiment, is half the rotation speed in the full mode. It should be noted that in the off mode described later, the terminal system 2 may rotate the fan at a lower rotation speed than in the eco mode, or may not drive the fan.

Further, in the eco mode, the terminal system 2 limits the start of the additional storage device 3. Although described in detail later, basically, when the additional storage device 3 is accessed in the eco mode, the additional storage device 3 is started.

As described above, in the present embodiment, in the eco mode, the driving of components having a large driving sound, such as the cooling fan 16 and the additional storage device 3, is restrained. This makes it possible to reduce the operating sound of the terminal system 2 in the state where the user is not using the terminal system 2 (the eco mode), and to suppress the feeling of discomfort to be given to be the user.

(2-3: Off Mode)

The off mode is a mode where the user is not using the terminal system 2 (is not using an application), and the above communication process is not performed. As shown in FIG. 3, in the off mode, power is supplied only to the power source control unit 23 among the units 21 to 23 of the control section 14. Further, power is supplied to the input reception section 12. As described above, the off mode is a mode where among all the components of the terminal system 2, fewer members operate (power is supplied to fewer members) than in the eco mode. The off mode is a mode that consumes less power than the eco mode.

In the off mode, to change the operation mode of the terminal system 2 in accordance with a predetermined time schedule, the power source control unit 23 measures time (the details will be described later). Further, the input reception section 12 is capable of operating so that the input reception section 12 can receive a start instruction given to the terminal system 2. The start instruction is an instruction to shift the operation mode of the terminal apparatus to the full mode. It should be noted that if, in the terminal system 2, an apparatus (a main apparatus) including the control section 14 is separate from an apparatus (a controller) including the input reception section 12, only the members in the main apparatus that communicate with the controller may be operating. In other words, power may be supplied only to the members in the main apparatus that communicate with the controller.

As described above, in the off mode, most of the functions of the terminal system 2 are halted, and the terminal system 2 is in a halted state. It should be noted that in the present embodiment, the "halted state" means the state where an application execution process in the full mode and the communication process in the eco mode are not performed. In the off mode, it is not that no operation is performed at all, and a predetermined operation may be performed in some circuit (the power source control unit 23 here). That is, the off mode can be said to be a mode where software is not executed, added, or updated (can be said to be a halt mode).

As described above, in the present embodiment, the terminal system 2 operates in any one of the three operation modes. The operation mode may be controlled by any method (circuit). In the present embodiment, the operation mode is controlled by the power source control unit 23, which controls the supply of power, and the second processing unit 22, which gives the power source control unit 23 an instruction regarding the operation mode (where necessary). It should be noted that in another embodiment, the terminal system 2 may operate in a mode other than the above three modes.

It should be noted that in the present embodiment, the terminal system 2 displays the operation mode using the light-emitting section. Specifically, the light-emitting section is controlled by the power source control unit 23 so that the form of light emission (the color, the blink speed, and/or the like) varies in each operation mode. It should be noted that the light-emitting section may display at least the eco mode and the off mode so as to be distinguishable from each other. This is because the full mode can be easily distinguished by the user. Further, in another embodiment, the display of the display section 13 may display the operation mode. As described above, the terminal system 2 may include a mode display section (the light-emitting section, the display, and/or the like) that displays at least the eco mode and the off mode so as to be distinguishable from each other. It should be noted that in another embodiment, the terminal system 2 may include a sound output section (a loudspeaker, for example) that outputs sound so that at least the eco mode and the off mode are distinguishable from each other. As described above, the terminal system 2 includes means for notifying that the terminal system 2 is in the eco mode or the off mode. This makes it possible to notify the user that the terminal system 2 is in the eco mode or the off mode.

[3. Overview of Intermittent Start of Eco Mode of Terminal System 2]

Next, a description is given of an overview of the operation in which the eco mode is intermittently started in the terminal system 2. FIG. 4 is a diagram showing an example of the operation in which the eco mode is intermittently started. FIG. 4 shows the transition of the operation mode in the periods before and after the operation mode of the terminal system 2 shifts from the full mode to the off mode, and in the periods thereafter. It should be noted that in FIG. 4, to describe an overview of the intermittent operation of the eco mode, some processes in the full mode and the eco mode (a setting process described later and the like) are omitted.

In the present embodiment, the operation mode used when the user uses the terminal system 2 is the full mode. As shown in FIG. 4, in the full mode, an application execution process is performed. The application execution process is the process of executing an application in accordance with an instruction from the user. If a predetermined ending condition (for example, the fact that an end instruction has been given by the user, or the like) has been satisfied in the full mode, the operation mode transitions from the full mode to the off mode.

As shown in FIG. 4, in the present embodiment, in the off mode, the eco mode is started (the off mode shifts to the eco mode) intermittently. The terminal system 2 automatically starts the eco mode regardless of an instruction from the user (independently of an instruction from the user). In the eco mode, the communication process described above is performed. Although described in detail later, if the communication process has ended, the eco mode shifts to the off mode.

In the present embodiment, the terminal system 2 repeats the operation in the off mode and the operation in the eco mode until a predetermined start instruction is given (see FIG. 4). It should be noted that in the present embodiment, the eco mode is started periodically. That is, if a predetermined time has elapsed since the eco mode has ended, the eco mode is started again. As described above, in the present embodiment, the eco mode is started in accordance with the predetermined time schedule.

As described above, in the present embodiment, the terminal system 2 can operate in the three modes different from one another in power consumption, and when operating in the off mode, shifts the operation mode to the eco mode periodically (or "in accordance with the predetermined time schedule"). Further, in the eco mode, predetermined information processing (the communication process via the network 5) is performed. Thus, in the present embodiment, in a period in which the user is not using the terminal system 2 (a period other than that of the full mode), information processing (the communication process) is performed, and while the information processing is not performed, the terminal system 2 enters a state of consuming less power (the off mode). This makes it possible to reduce the power consumption in the above period, and save power in the terminal system 2. In other words, it is possible to perform useful information processing while saving power in the above period.

[4. Operation of Terminal System 2]

Next, the operation of the terminal system 2 is described. A description is given below of the operation in the eco mode, and also a description is given of the operations in the other operation modes mainly regarding the operation related to the eco mode.

(4-1: Shift from Full Mode to Off Mode)

Figure 5:
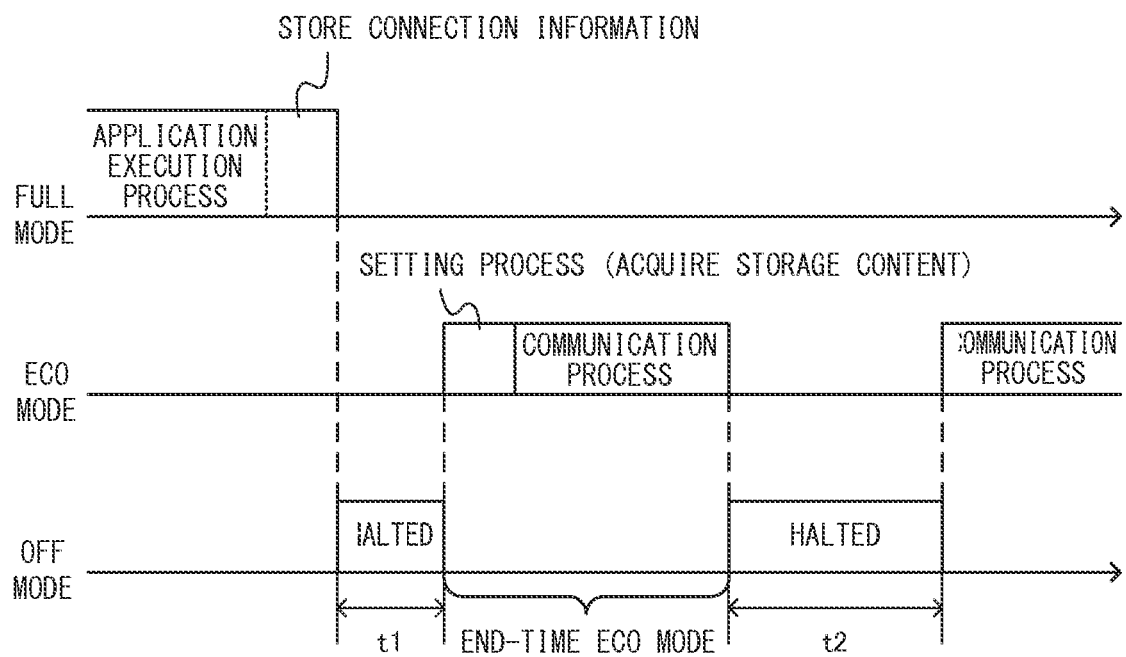
FIG. 5 is a diagram showing an example of the transition of the operation mode when a full mode ends and thereafter.

FIG. 5 is a diagram showing an example of the transition of the operation mode when the full mode ends and thereafter. As shown in FIG. 5, in the present embodiment, if the predetermined ending condition has been satisfied in the full mode, the full mode ends and shifts to the off mode. Then, after the shift to the off mode, the eco mode is intermittently started. It should be noted that in the present embodiment, the above ending condition is the fact that a predetermined end instruction has been given by the user. That is, the terminal system 2 ends the full mode in accordance with the fact that the user has performed the operation of giving an end instruction (for example, the operation of pressing a power button or the operation of selecting an end instruction on the menu screen).

It should be noted that the ending condition is any ending condition, and another condition may be set as an ending condition in addition to (or instead of) the above condition. For example, the ending condition may include the condition that "the user has not provided an input for a predetermined time (an hour, for example) in the state of not waiting for processing". It should be noted that the state of waiting for processing is, for example, the state during the update of an application, or the state during the installation of a new application. That is, in the state of waiting for processing, the terminal system 2 may automatically end the full mode in accordance with the fact that the user has not provided an input for a predetermined time.

(Storage of Connection Information)

Figure 6:
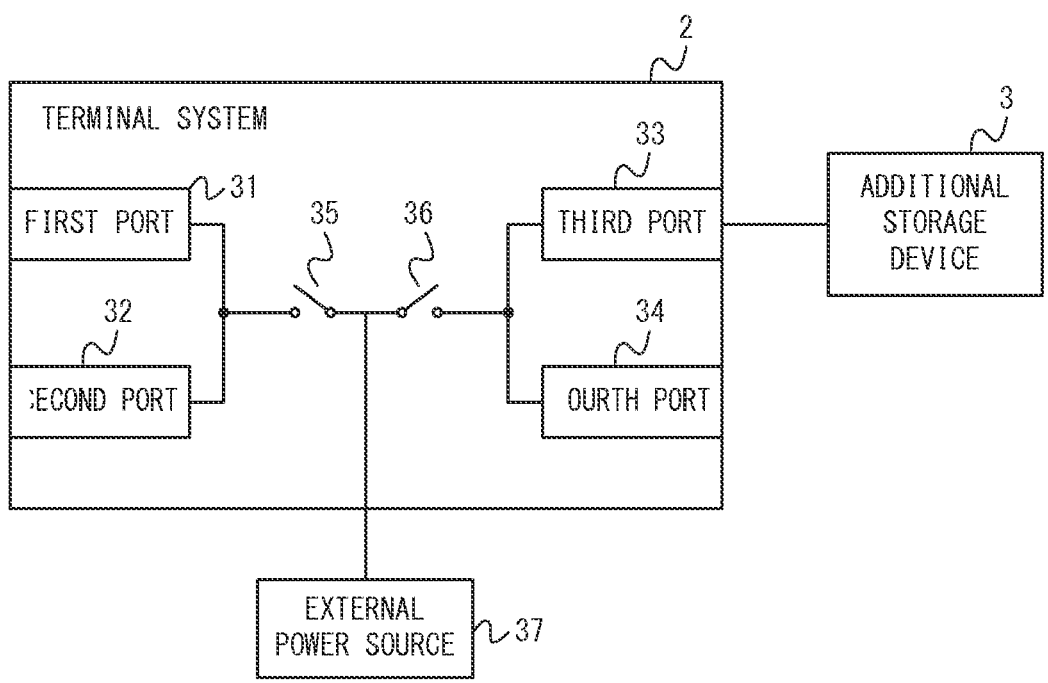
FIG. 6 is a diagram showing an example of the connection of ports of the terminal system 2 and additional devices.

In the present embodiment, after the ending condition has been satisfied, the terminal system 2 stores connection information and then ends the full mode (see FIG. 5). The connection information is information regarding various additional devices (including the additional storage device 3) connected to the terminal system 2. It should be noted that the connection information is used in the process performed in the eco mode (an update process and an addition process described later). With reference to FIG. 6, an example of the connection information is described below.

FIG. 6 is a diagram showing an example of the connection of ports of the terminal system 2 and additional devices. In the present embodiment, the terminal system 2 includes a first port 31, a second port 32, a third port 33, and a fourth port 34 as ports for connecting to additional devices. It should be noted that the number of ports of the terminal system 2 is any number. In the present embodiment, the ports 31 to 34 are USB ports, and the additional storage device 3 is a storage device capable of USB connection. The method, however, of connecting the terminal system 2 to the additional devices is any method.

In the present embodiment, the supply of power to part (some) of the plurality of ports 31 to 34 of the terminal system 2 is controlled together. Specifically, as shown in FIG. 6, a first switch 35 is provided between an external power source 37, which is connected to the terminal system 2, and the first and second ports 31 and 32. Further, a second switch 36 is provided between the external power source 37 and the third and fourth ports 33 and 34. It should be noted that although not shown in the figures, the switches 35 and 36 are controlled by the control section 14. As described above, in the present embodiment, the supply of power to the first port 31 and the second port 32 is controlled together, and the supply of power to the third port 33 and the fourth port 34 is controlled together. Thus, the supply of power to a plurality of additional devices connected to different ports is controlled together. Thus, in the present embodiment, the terminal system 2 can simplify the configuration for controlling the supply of power to the additional devices, and can also stop supplying power to some of the additional devices connected to the terminal system 2. It should be noted that in another embodiment, the terminal system 2 may have a configuration in which the supply of power can be controlled with respect to each port.

In the present embodiment, the terminal system 2 stores the connection states of the additional devices connected to the ports 31 to 34 as the connection information in the storage section 15. For example, in FIG. 6, the additional storage device 3 is connected to the third port 33. Thus, in the state shown in FIG. 6, the connection information to be stored includes information associating information indicating the third port 33 with information indicating the additional storage device 3. It should be noted that the connection information may be any information that allows the specifying of the port to which the additional storage device 3 to be accessed in the eco mode is connected.

It should be noted that when a plurality of additional storage devices are connected to the terminal system 2, there may be a limit on additional storage devices that can be used at a time. For example, the terminal system 2 may limit additional storage devices to be used at a time to a predetermined number (one, for example). At this time, the connection information may include information specifying the additional storage devices that can be used. The information specifying the additional storage devices that can be used is, for example, information indicating the additional storage devices, or information indicating ports to which the additional storage device are connected. This information and the information indicating the connection states enable the specifying of an additional storage device to be accessed in the eco mode.

(Off Mode after End of Full Mode)

Here, the operation in the eco mode after the end of the full mode is automatically performed and is not an operation performed based on the user's intention. Thus, if the full mode has ended, the user may think that the operation of the terminal system 2 has ended. As a result, the user may turn off the power source of the terminal system 2 (pull out the plug), or may perform the work of disconnecting the additional storage device 3 connected to the terminal system 2. Such work may have an adverse influence on the process during the eco mode. Consequently, if the eco mode has started immediately after the end of the full mode, the user may perform the above work during the eco mode, which may result in preventing the proper execution of the process in the eco mode. It should be noted that as described above, in the eco mode in the present embodiment, the operating sound of the terminal system 2 also becomes small, which makes it difficult for the user to recognize the operation during the eco mode. This has the advantage of reducing unnecessary noise of the terminal system 2, but on the other hand, may cause the user to perform the above work.

Based on the above, in the present embodiment, the terminal system 2 once shifts the full mode to the off mode without directly shifting from the full mode to the eco mode, and then starts the eco mode. That is, as shown in FIGS. 4 and 5, the terminal system 2 shifts the operation mode from the full mode to the off mode, and then shifts the operation mode from the off mode to the second mode periodically (or in accordance with the time schedule). This makes it possible to, even if the user has performed the above work after the end of the full mode, reduce the possibility that the work is performed during the eco mode. This results in enabling the proper execution of the process during the eco mode.

It should be noted that in another embodiment, if an end instruction has been given in the full mode, the operation mode may shift to the eco mode first, and may shift to the off mode after the eco mode.

Further, a time interval t1 between the end of the full mode and the initial start of the eco mode (see FIG. 5) may be a time sufficient for the user to perform the above work. For example, the time interval t1 may be set to about 10 seconds to several minutes. It should be noted that although described in detail later, the communication process performed in the eco mode in the present embodiment is the process of confirming with the server 4 the presence or absence of data to be acquired and acquiring the data from the server 4 where necessary, in order to update or add software or receive a message. Thus, a time interval (a start interval between the eco modes) t2 between the eco mode and the next eco mode may be set to be relatively long. Thus, the time interval t1 may be set to be shorter than the start interval t2 between the eco modes. This makes it possible to quickly start the initial eco mode after the full mode has ended, and then intermittently start the eco mode at an appropriate frequency.

(4-2: End-Time Eco Mode)

Next, with reference to FIG. 5 again, a description is given of the operation in the eco mode (referred to as an "end-time eco mode") that is started initially after the full mode has ended. As shown in FIG. 5, in the end-time eco mode, a predetermined setting process is performed.

In the present embodiment, the setting process is the process of acquiring the storage content of the additional storage device 3. More specifically, the terminal system 2 acquires information for specifying an application (identification information of an application) of which data is stored in the additional storage device 3. The identification information may be any information that allows the specifying of an application, and is, for example, information of the title of an application, or information of an ID number assigned to each application. Thus, if a program of an application and/or data to be used in an application (saved data or the like) is stored in the additional storage device 3, the identification information of the application is acquired.

In the setting process, first, the terminal system 2 starts the additional storage device 3. That is, in accordance with an instruction from the second processing unit 22, the power source control unit 23 supplies power to the additional storage device 3. It should be noted that based on the connection information described above, the second processing unit 22 specifies the additional storage device 3 to be accessed. Then, the switches 35 and 36 are controlled so that power is supplied to the port to which the specified additional storage device 3 is connected. This results in supplying power to the specified additional storage device 3 and starting the additional storage device 3. Then, the terminal system 2 acquires the identification information of an application from the additional storage device 3 and stores the acquired identification information in the storage section 15.

It should be noted that when the full mode has ended, the additional storage device 3 may not be connected to the terminal system 2. It can be determined based on the connection information that the additional storage device 3 is not connected to the terminal system 2. Thus, in the above case, the terminal system 2 determines that no application is stored in the additional storage device 3, and stores information indicating this in the storage section 15. In this case, the terminal system 2 determines that the setting process has been normally completed (has been successful). On the other hand, even if the connection information indicates that the additional storage device 3 is connected to the terminal system 2, the additional storage device 3 cannot be accessed in the end-time eco mode for some reason. Although described in detail later, in this case, the terminal system 2 determines that the setting process has failed.

In the present embodiment, the terminal system 2 stores a list of pieces of identification information (referred to as an "additional application list") acquired as described above in the storage section 15. It should be noted that applications may be stored also in an internal memory (the storage section 15) of the terminal system 2. In this case, the storage section 15 stores a list of the applications (referred to as a "main application list"). Thus, information of applications executable by the terminal system 2 is stored as the additional application list and the main application list in the storage section 15.

Although described in detail later, in the eco mode after the setting process has been completed, the communication process is performed using the identification information (the additional application list) acquired as described above. That is, the setting process in the present embodiment is the process of setting (acquiring) information to be used in the operation in the eco mode.

Further, as shown in FIG. 5, in the present embodiment, if the setting process has been completed (identification information has been acquired) in the end-time eco mode, the communication process is performed. Although the content of the communication process will be described later, the communication process in the end-time eco mode is similar to the communication process in the eco mode for the second time and thereafter. It should be noted that in another embodiment, the terminal system 2 may perform only the setting process (without performing the communication process) in the end-time eco mode.

As described above, in the initial eco mode after the end of the full mode, the terminal system 2 performs at least a predetermined setting process, and in the eco mode after the completion of the setting process, the terminal system 2 performs information processing (the communication process) related to the setting process. As described above, the setting process is performed in the initial eco mode (the end-time eco mode), and the communication process is performed (without performing the setting process) in the eco mode thereafter. This makes it possible to efficiently perform the process in the eco mode.

Specifically, based on the processing result of the setting process, the terminal system 2 performs the operation in the eco mode after the completion of the setting process. This makes it possible to set the operation in the eco mode every time the full mode ends, and to perform the eco mode by an appropriate operation based on the situation. For example, in the present embodiment, the terminal system 2 acquires the identification information of an application when the full mode has ended. This makes it possible to perform the operation in the eco mode (the communication process) using the latest information regarding an application stored in the additional storage device 3.

More specifically, the terminal system 2 performs as the setting process the process of acquiring information (the identification information of an application) to be used in the information processing to be performed in the eco mode (the communication process) after the completion of the setting process. This can simplify the communication process to be performed later.

It should be noted that the setting process is not limited to the process of acquiring information to be used in the communication process. For example, as another example of, based on the processing result of the setting process, performing the operation in the eco mode after the completion of the setting process, the time schedule of the eco mode may be determined based on the result of the setting process. Specifically, the terminal system 2 may set the start interval between the eco modes based on the number of applications stored in the additional storage device 3, or may set the start time of the eco mode based on the type of the application stored in the additional storage device 3.

(Case where Setting Process Fails)

As described above, in the end-time eco mode, the setting process may fail (the identification information of an application may not be acquired) for some reason. For example, in the off mode to which the operation mode has shifted after the end of the full mode, if the additional storage device 3 has been disconnected from the terminal system 2, the terminal system 2 cannot acquire the identification information of an application, and the setting process fails.

Figure 7:
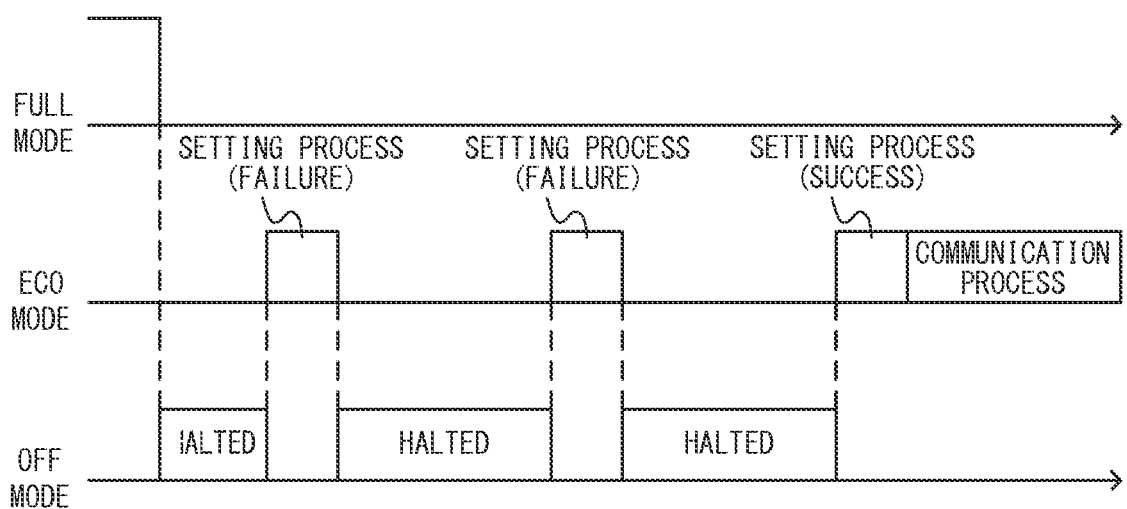
FIG. 7 is a diagram showing an example of the transition of the operation mode when a setting process has failed.

In the present embodiment, if the setting process has failed in the end-time eco mode, the terminal system 2 performs the setting process again in the next eco mode. FIG. 7 is a diagram showing an example of the transition of the operation mode when the setting process has failed. As shown in FIG. 7, if the setting process has failed in the end-time eco mode, the terminal system 2 ends the eco mode without performing the communication process. Then, in the next eco mode, the terminal system 2 performs the setting process again. The setting process in the eco mode for the second time and thereafter is similar to the setting process in the eco mode for the first time (the end-time eco mode). That is, if the setting process has failed (again), the terminal system 2 ends the eco mode without performing the communication process, and performs the setting process again in the next eco mode (see FIG. 7). If, on the other hand, the setting process has been successful, the terminal system 2 performs the communication process to end the eco mode, and performs only the communication process in the eco mode for the second time and thereafter (see FIG. 7). As described above, in the present embodiment, the terminal system 2 repeats the setting process until the setting process is successful in the eco mode, and then performs the communication process after the setting process has been successful.

As described above, if it has been determined that in the initial eco mode after the end of the full mode, it is not possible to perform information processing (the communication process) based on the processing result of the setting process (if the setting process has failed), the terminal system 2 performs the setting process again in the next eco mode. This makes it possible to certainly acquire the processing result of the setting process.

It should be noted that in another embodiment, even if the setting process has not been successful, the terminal system 2 may perform the communication process in the subsequent eco mode. For example, the terminal system 2 may perform the communication process without using the result of the setting process. For example, in the present embodiment, the communication process may be performed without accessing the additional storage device 3 (on the assumption that the additional storage device 3 is not connected). Further, the terminal system 2 may perform the communication process using the processing result of the setting process that has previously been successful.

(4-3: Start Interval Between Eco Modes)

As described above, in the present embodiment, the eco mode intermittently starts. In the present embodiment, the start interval between the eco modes is constant. Here, as described above, the time interval between the eco mode and the next eco mode (the start interval between the eco modes) may be set to be relatively long. The start interval between the eco modes may be set to be, for example, about an hour to several days.

It should be noted that in the present embodiment, "the start interval between the eco modes" means the interval between when the eco mode ends and when the eco mode is started next. However, "the start interval between the eco modes" may mean the interval between when the eco mode starts and when the eco mode is started next, and the start interval between the eco modes may be constant in this sense.

Further, in another embodiment, the start interval between the eco modes may not necessarily be constant. For example, the terminal system 2 may start the eco mode, for example, at 9 am and at 7 pm every day in accordance with a predetermined time schedule. Alternatively, when operating in the off mode, the terminal system 2 may repeatedly and automatically start the eco mode.

Further, in the present embodiment, the start timing of the eco mode can be set by the user in the previous full mode. That is, in the full mode, in accordance with an instruction from the user, the terminal system 2 causes the display section 13 to display a setting change screen for changing various settings including the start interval between the eco modes. Then, the terminal system 2 receives an input of the start interval between the eco modes from the user on the setting change screen. For example, the user may be allowed to select a start interval on an hourly basis in the range of 1 to 25 hours. Alternatively, in another embodiment, the user may be allowed to set the time when the eco mode is started. Information indicating the input start timing (the start interval here) is stored in the storage section 15. After the end of the full mode, with reference to the information stored in the storage section 15, the terminal system 2 starts the eco mode at the start interval set by the user in the full mode.

As described above, based on an instruction from the user in the full mode before the operation mode shifts to the off mode, the terminal system 2 determines the start interval between the eco modes when operating in the off mode. This makes it possible to set the start interval between the eco modes so as to suit the user's convenience.

Further, the start interval between the eco modes may be set to be longer in the eco mode than in the off mode in a period in which the user is not using the terminal system 2. That is, the start interval between the eco modes when the terminal system 2 operates in the off mode may be set to be longer than the time required for the eco mode when only a basic process in the eco mode is performed. Here, the "basic process in the eco mode" is the process to be performed at least in a single eco mode, and in the present embodiment, is the process of inquiring of the server 4 (steps S11, S21, and S31 described later). That is, the start interval between the eco modes may be set so that if software is not updated or added or a message is not received, the time of the off mode is longer than the time of the eco mode. Based on the above, it is possible to start the eco mode at an appropriate frequency.

(4-4: Communication Process in Eco Mode)

Next, the communication process in the eco mode is described. The communication process in the present embodiment is the process of acquiring data from the server 4 via the network 5 where necessary, and controlling (adding or changing) the storage contents of the terminal system 2 and/or the additional storage device 3. Specifically, in the present embodiment, three types of processes, namely an update process, an addition process, and a message process, are performed as the communication process. The update process is the process of acquiring update data (a patch, for example) regarding an application executable by the terminal system 2 (hereinafter referred to as an "executable application"), and updating the application using the update data. The addition process is the process of acquiring a new application (program) and installing the new application. The message process is the process of receiving a message from the server 4. These processes are described below.

(4-4-1: Update Process)

Figure 8:
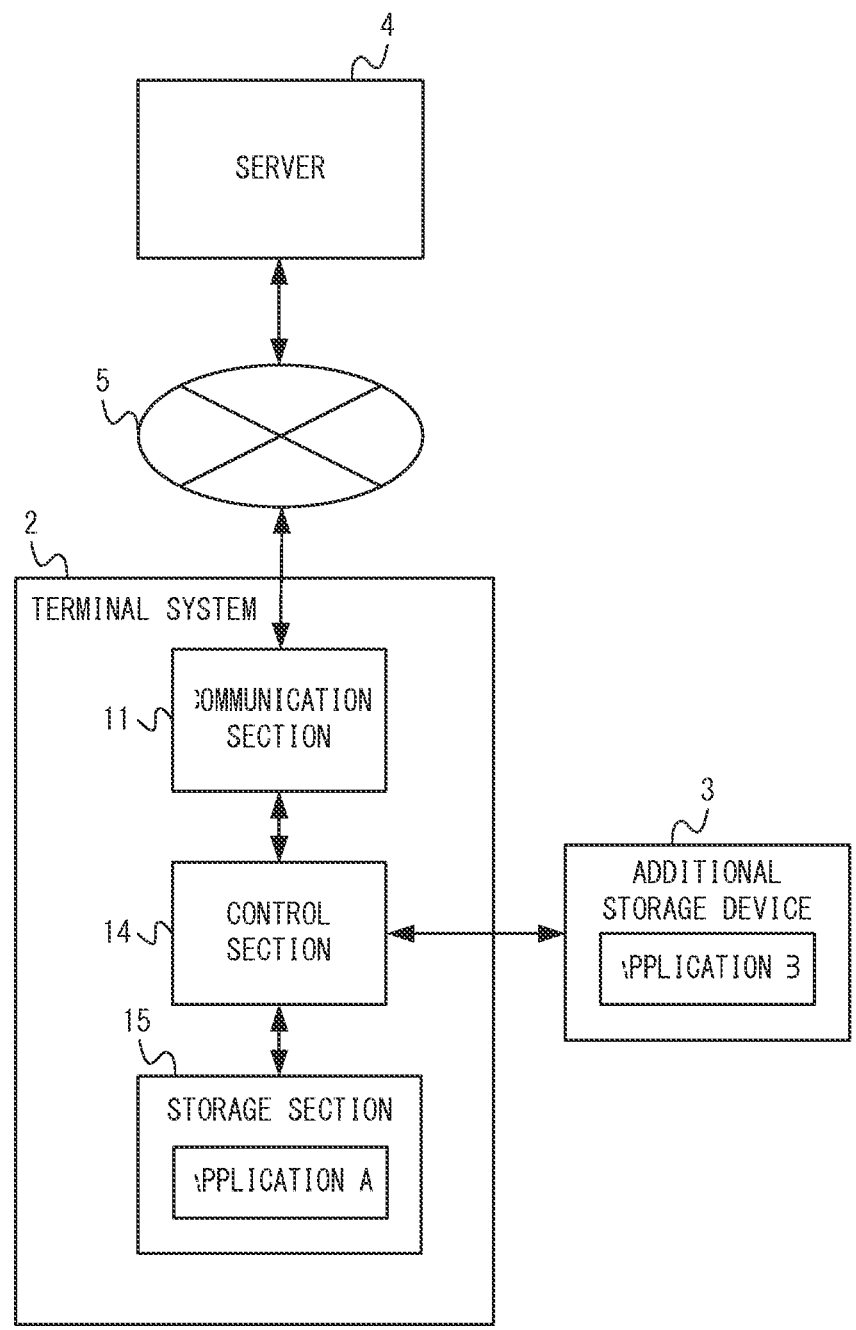
FIG. 8 is a diagram showing examples of the terminal system 2 and an additional storage device 3 before an update process is started.
Figure 9:
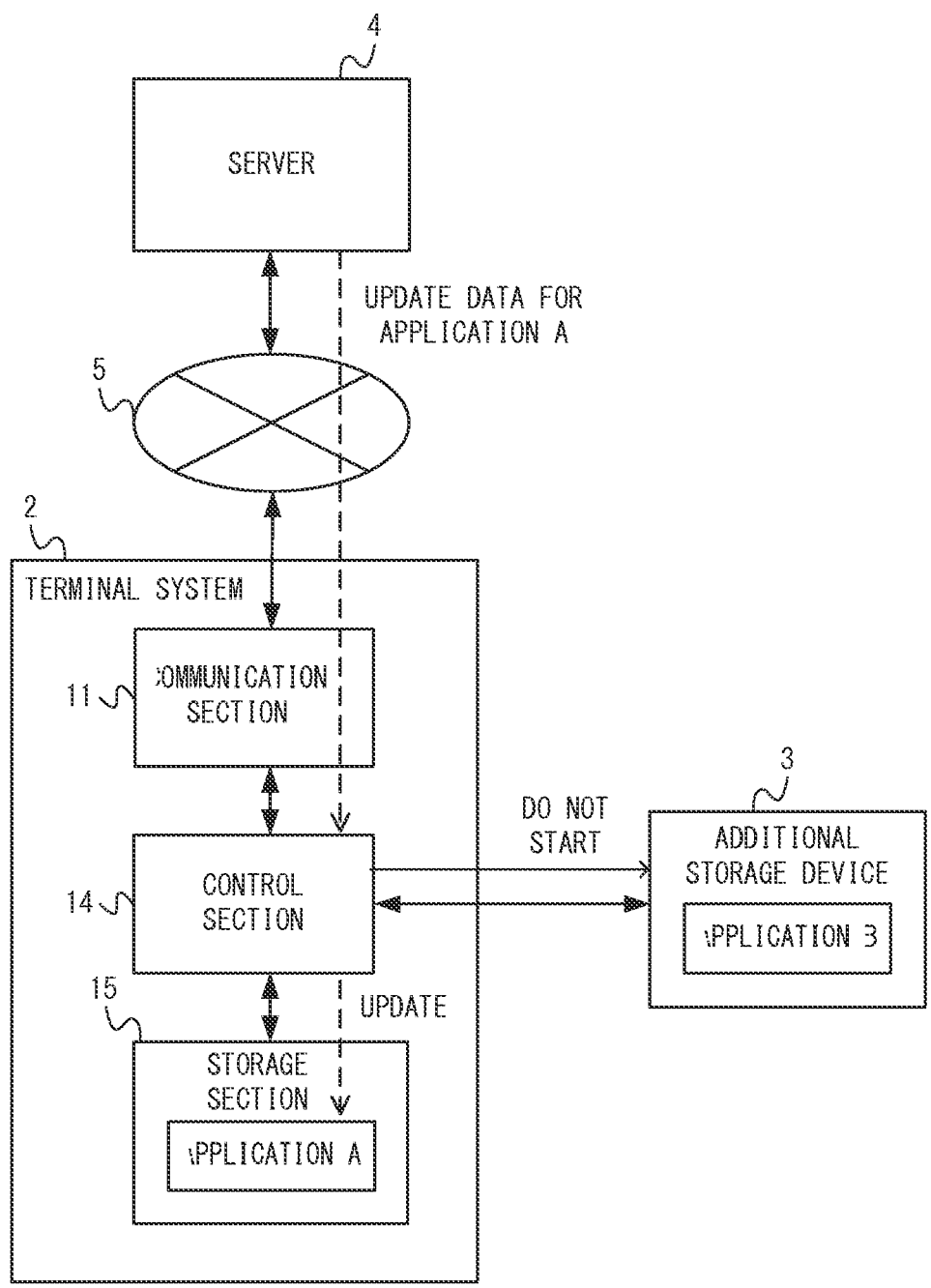
FIG. 9 is a diagram showing examples of the terminal system 2 and the additional storage device 3 when an application stored in a storage section 15 is updated.
Figure 10:
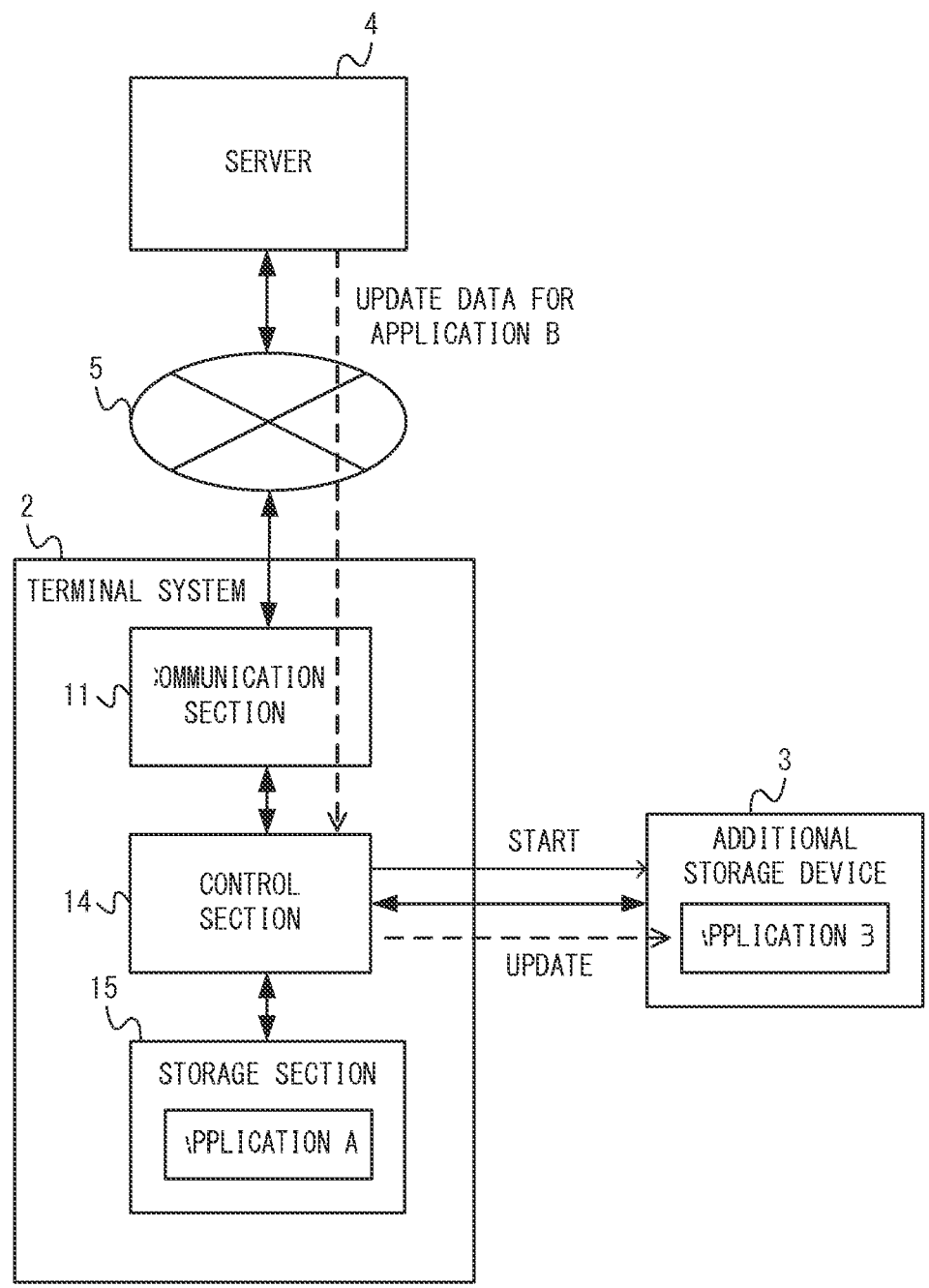
FIG. 10 is a diagram showing examples of the terminal system 2 and the additional storage device 3 when an application stored in the additional storage device 3 is updated.

First, with reference to FIGS. 8 to 10, an overview of the operation of the update process is described. FIG. 8 is a diagram showing examples of the terminal system 2 and the additional storage device 3 before the update process is started. FIG. 9 is a diagram showing examples of the terminal system 2 and the additional storage device 3 when an application stored in the storage section 15 is updated. FIG. 10 is a diagram showing examples of the terminal system 2 and the additional storage device 3 when an application stored in the additional storage device 3 is updated.

In the example shown in FIG. 8, an application A is stored in the storage section 15 of the terminal system 2, and an application B is stored in the additional storage device 3. In this example, if an update of the application A is present, update data corresponding to the application A is transmitted from the server 4 to the terminal system 2 (see FIG. 9). As shown in FIG. 9, having received the update data, the terminal system 2 updates the application A in the storage section 15. At this time, the terminal system 2 does not need to access the additional storage device 3, and therefore, the additional storage device 3 is not started.

If, on the other hand, an update of the application B is present in the above example, update data corresponding to the application B is transmitted from the server 4 to the terminal system 2 (see FIG. 10). As shown in FIG. 10, having received the update data, the terminal system 2 first starts the additional storage device 3, and then updates the application B in the additional storage device 3. As described above, in the present embodiment, the terminal system 2 starts the additional storage device 3 only if it is necessary in the eco mode (however, there is an exception described later).

Figure 11:
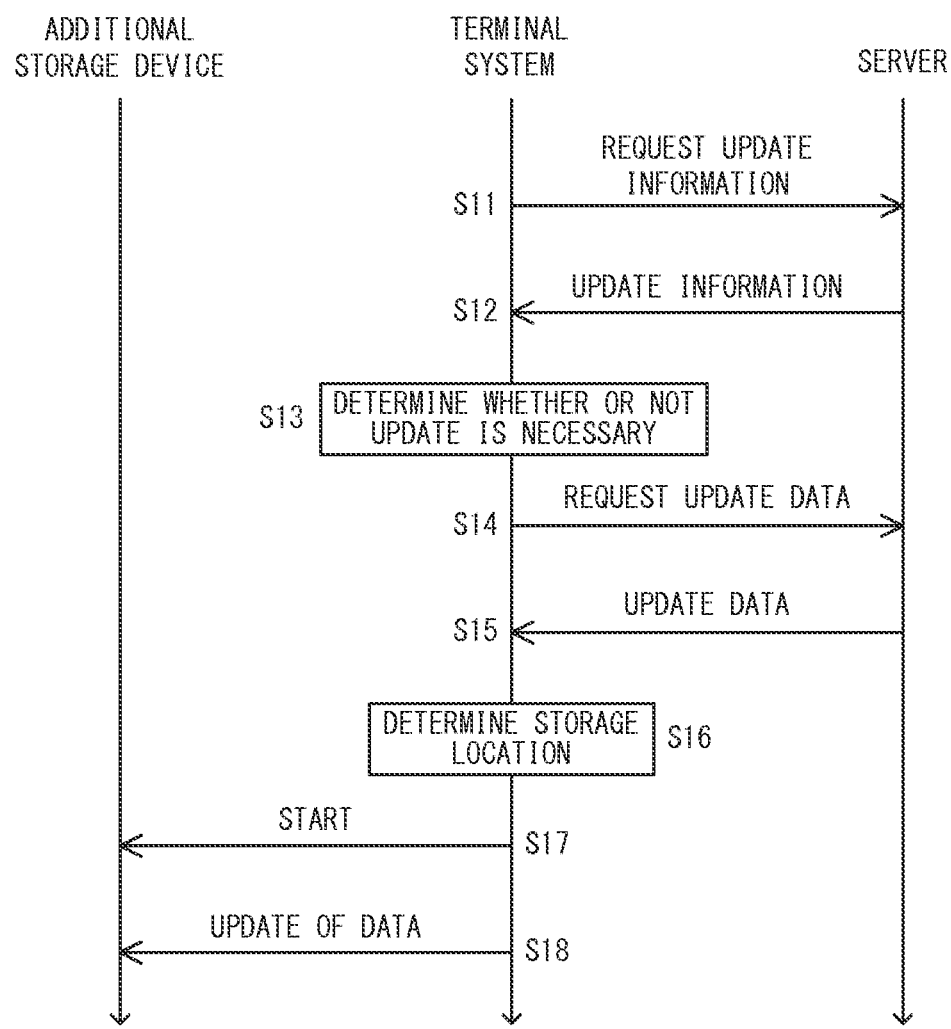
FIG. 11 is a timing chart showing an example of the flow of the processing of the update process.

An example of the specific processing in the update process is described below. FIG. 11 is a timing chart showing an example of the flow of the processing of the update process. The timing chart shown in FIG. 11 shows the flow of the update process performed in a single eco mode.

If the eco mode has been started, the terminal system 2 first determines whether or not it is necessary to perform an update (steps S11 to S13). That is, the terminal system 2 determines whether or not there is an application to be updated among the executable applications. Specifically, the terminal system 2 inquires of the server 4 about the presence or absence of update information (step S11). The update information is information that allows the determination of the presence or absence of an update with respect to each application. In the present embodiment, the update information is information associating the identification information of an application (specifically, title information) with information representing the version of the application (version information).

In accordance with the above inquiry, the server 4 transmits the update information to the terminal system 2 (step S12). The update information to be transmitted may include information regarding all the applications provided by the server 4 (regardless of the executable applications of the terminal system 2), or may include only information regarding the executable applications.

Having received the update information from the server 4, the terminal system 2 determines the presence or absence of an update of the executable application based on the update information (step S13). The determination can be made by comparing the current version information of the executable application with the version information of the application included in the update information. It should be noted that in the present embodiment, the current version information of the executable application has been stored and saved in the storage section 15 when the application has been installed and when the application has been updated.

Although not shown in the figures, if it has been determined that no update is present, the terminal system 2 ends the update process. At this time, in the current eco mode, the processes after step S14 are not performed.

If, on the other hand, it has been determined that an update is present, the terminal system 2 acquires update data regarding the application of which the update is present from the server 4. The update data is, for example, patch data for making modifications and/or additions to the application, additional data to be used in the application, or the like. Specifically, the terminal system 2 requests update data from the server 4 (step S14). In accordance with the request, the server 4 transmits the update data to the terminal system 2 (step S15).

Having received the update data from the server 4, the terminal system 2 updates the application using the update data (steps S16 to S18). Specifically, first, the terminal system 2 determines the storage location for the application related to the update (the application corresponding to the update data) (step S16). That is, it is determined whether the application related to the update is stored in the internal memory (the storage section 15) of the terminal system 2 or stored in the additional storage device 3. In other words, the determination process in the above step S16 is the process of determining whether or not to access the additional storage device 3 to update the application.

The determination in step S16 is made using the additional application list generated in the setting process. That is, if the identification information of the application related to the update is included in the additional application list, it is determined that the storage location for the application is the additional storage device 3. If, on the other hand, the identification information of the application related to the update is not included in the additional application list (is included in the main application list), it is determined that the storage location for the application is the storage section 15. As described above, the update process is performed using the information (the additional application list) acquired in the setting process described above.

Next, the terminal system 2 updates the application using the update data. Here, if it has been determined that the storage location for the application related to the update is the additional storage device 3, the terminal system 2 accesses the additional storage device 3, thereby performing the update. That is, the terminal system 2 starts the additional storage device 3 (step S17), and updates the data of the application stored in the additional storage device 3, using the update data (step S18). It should be noted that the additional storage device 3 is started by the second processing unit 22 supplying power to the additional storage device 3 using the power source control unit 23. The application may be updated by actually changing the program per se of the original application, or by storing the original program and the patch data in association with each other and making the application capable of being executed based on the content after the update.

On the other hand, although not shown in the figures, if it has been determined that the storage location for the application related to the update is the storage section 15, the terminal system 2 accesses the storage section 15, thereby performing the update. In this case, the additional storage device 3 is not started.

It should be noted that if it has been determined that updates of a plurality of executable applications are present, the processes of steps S14 to S18 are performed for each executable application. Then, if all the executable applications that need to be updated have been updated, the terminal system 2 ends the update process.

As described above, in the present embodiment, basically, the terminal system 2 starts the additional storage device 3 only if it is necessary to access the additional storage device 3 during the eco mode. In the present embodiment, however, the supply of power to two ports is controlled together (see FIG. 6). Further, an additional device to be started during the eco mode may be connected to a port to which the power supply is controlled together with the port connected to the additional storage device 3. It should be noted that an additional device to be started during the eco mode is, for example, a communication apparatus having the function of connecting to the network 5 (that is, the communication apparatus functions as the communication section 11). In the above case, as a result of supplying power to the port connected to the additional device to be started during the eco mode, power is supplied also to the additional storage device 3. That is, in the present embodiment, in the above case, exceptionally, the additional storage device 3 is started even if it is not necessary to access the additional storage device 3.

Further, the terminal system 2 stores application information indicating applications executable by the terminal system 2 (the additional application list and the main application list), and acquires data regarding the applications indicated by the application information. This enables the terminal system 2 to certainly acquire data regarding an executable applications from the server 4.

Further, in the present embodiment, in the eco mode, the terminal system 2 determines based on the storage content of the additional storage device 3 acquired in advance (the identification information of an application acquired in the setting process) whether or not to start the additional storage device 3. This makes it possible to provide an opportunity where the additional storage device 3 is not started depending on the storage content of the additional storage device 3, and to reduce the power consumption during the eco mode. Further, if the additional storage device 3 produces a driving sound, it is possible to reduce the driving sound produced in the eco mode.

It should be noted that as described above, in the present embodiment, even if it is not necessary to access the additional storage device 3, the additional storage device 3 may be exceptionally started. Even in this case, it is determined based on the storage content of the additional storage device 3 whether or not to start the additional storage device 3. This makes it possible to provide an opportunity where the additional storage device 3 is not started, and therefore to provide the above effects.

Further, in the present embodiment, in the initial eco mode after the end of the full mode, the terminal system 2 acquires the storage content of the additional storage device 3 (see the setting process shown in FIG. 5). This enables the terminal system 2 to acquire the storage content when the full mode has ended, and to accurately determine whether or not to start the additional storage device 3.

It should be noted that a description has been given of the case where an application is updated. Alternatively, the system software of the terminal system 2 may be updated in the update process. It should be noted that the system software is stored in the storage section 15, and therefore, if the system software is updated, the terminal system 2 does not need to start the additional storage device 3.

(4-4-2: Addition Process)

Next, the addition process performed during the eco mode is described. In the present embodiment, a new application may be downloaded from the server 4 to the terminal system 2 and added to the terminal system 2. It should be noted that as an example of such a case, for example, an application for which the user of the terminal system 2 has performed a purchase procedure by some method (for example, has performed a purchase procedure by accessing the server 4 from an information processing apparatus other than the terminal system 2) may be downloaded from the server 4 to the terminal system 2. Further, as another example of the above case, an application provider may cause a free (trial or demo) application to be downloaded from the server 4 to the terminal system 2 (regardless of the user's intention). If an additional application as described above is prepared in the server 4, the terminal system 2 acquires the additional application by the addition process during the eco mode.

Figure 12:
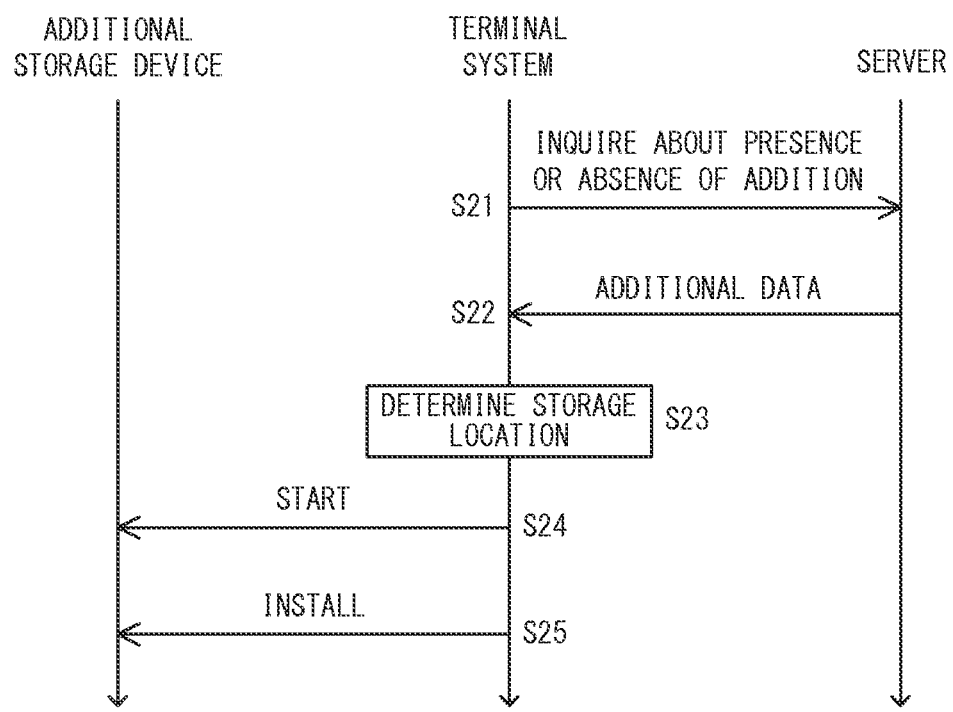
FIG. 12 is a timing chart showing an example of the flow of the processing of the addition process.

FIG. 12 is a timing chart showing an example of the flow of the processing of the addition process. The timing chart shown in FIG. 12 shows the flow of the addition process performed in a single eco mode.

If the eco mode has been started, the terminal system 2 first determines the presence or absence of an application to be added to the terminal system 2. That is, the terminal system 2 inquires of the server 4 about whether or not an application to be added is present (step S21). At this time, for example, the identification information of the terminal system 2 and the identification information of executable applications are transmitted to the server 4.

In accordance with the above inquiry, the server 4 determines whether or not an application to be added to the terminal system 2 having made the inquiry is present. The server 4 stores the identification information of an application to be added to the terminal system 2 and the identification information of the terminal system 2 in association with each other. Thus, with reference to the information included in the inquiry by the terminal system 2, the server 4 can specify an application to be added (downloaded) to the terminal system 2.

If it has been determined that an application to be added to the terminal system 2 is present, the server 4 transmits data of the application to be added to the terminal system 2 (step S22). On the other hand, although not shown in the figures, if it has been determined that an application to be added to the terminal system 2 is not present, the server 4 notifies the terminal system 2 that an additional application is not present. In this case, the terminal system 2 ends the addition process in the current eco mode without performing the processes of steps S23 to S25 described later.

When receiving the data of the application to be added from the server 4, the terminal system 2 determines the storage location for the received data (the installation location for the application) (step S23). That is, the terminal system 2 determines whether the additional application is to be stored in the storage section 15 or in the additional storage device 3. Here, in the present embodiment, if the additional storage device 3 has been connected to the terminal system 2 when the full mode has ended, the additional application is installed in the additional storage device 3. If, on the other hand, the additional storage device 3 has not been connected to the terminal system 2 when the full mode has ended, the additional application is installed in the storage section 15. It should be noted that with reference to the connection information described above, the terminal system 2 can know whether or not the additional storage device 3 has been connected to the terminal system 2 when the full mode has ended. That is, the terminal system 2 determines the storage location for the additional application based on the connection information.

If it has been determined that the additional storage device 3 has been connected to the terminal system 2, the terminal system 2 installs the additional application in the additional storage device 3. That is, the terminal system 2 starts the additional storage device 3 (step S24), and then stores (installs) the additional application in the additional storage device 3 (step S25).

On the other hand, although not shown in the figures, if it has been determined that the additional storage device 3 has not been connected to the terminal system 2, the terminal system 2 installs the additional application in the storage section 15. In this case, the additional storage device 3 is not started (however, there is an exception described above in "(4-4-1: Update Process)").

As in the update process and the addition process described above, in the present embodiment, in the eco mode, the terminal system 2 acquires data for updating and/or adding software executable by the terminal system 2, via the network 5. This makes it possible to update and/or add software during the eco mode (while the user is not aware of it).

Further, in the present embodiment, in the eco mode, the terminal system 2 performs information processing for acquiring a new application from an external apparatus (the server 4) via the network 5 and installing the acquired new application. Thus, in the present embodiment, a new application is added to the terminal system 2 during the eco mode where the user is not using the terminal system 2. As described above, the execution of the addition process during the eco mode makes it possible to reduce the processing performed during the full mode. Further, it is possible to provide a new application without the user's knowledge.

It should be noted that also in the addition process, similarly to the update process, the terminal system 2 may determine based on the storage content of the additional storage device 3 acquired in advance whether or not to start the additional storage device 3. For example, in accordance with the free space in the additional storage device 3, the terminal system 2 may determine whether or not to store the additional application in the additional storage device 3. Alternatively, in accordance with whether or not an application related to the additional application is stored in the additional storage device 3, the terminal system 2 may determine whether or not to store the additional application in the additional storage device 3. It should be noted that the terminal system 2 may be configured such that the user can set whether or not to store the additional application in the additional storage device 3.

As described above, in the update process described above, in accordance with the presence or absence of an application to be updated and in accordance with the storage location for the application to be updated, it is determined whether or not to access the additional storage device 3. Further, in the addition process, in accordance with the presence or absence of an additional application, it is determined whether or not to access the additional storage device 3. As described above, in the present embodiment, the terminal system 2 acquires data from an external apparatus (the server 4) via the network 5 and determines whether or not to access the additional storage device 3 for processing regarding the acquired data (the process of updating or adding an application). Then, based on the result of the determination of whether or not to access the additional storage device 3, the terminal system 2 determines whether or not to start the additional storage device 3. This makes it possible to provide an opportunity where the additional storage device 3 is not started, taking into account the presence or absence of access to the additional storage device 3. Thus, it is possible to reduce the power consumption during the eco mode and reduce the driving sound produced in the eco mode.

It should be noted that in the update process and the addition process, when data is stored in the additional storage device 3, the storage capacity of the additional storage device 3 may be insufficient. In this case, in the present embodiment, the terminal system 2 ceases the process. Then, in the full mode to be started next, the terminal system 2 notifies the user that the process has been ceased. Further, if the process has been ceased as described above, the terminal system 2 may end the eco mode and may not start the eco mode thereafter. Further, in another embodiment, if the storage capacity of the additional storage device 3 is insufficient, data may be stored in the storage section 15.

(4-4-3: Message Process)

Next, the message process performed during the eco mode is described. In the present embodiment, the server 4 may transmit a message to the terminal system 2. The content of the message may be any content. The server 4 prepares, for example, a message for giving a notification of an update of an application or system software, or a message for advertising a newly released application. If the server 4 prepares a message as described above, the terminal system 2 acquires the message in the message process during the eco mode. It should be noted that the user can view the acquired message during the full mode.

Figure 13:
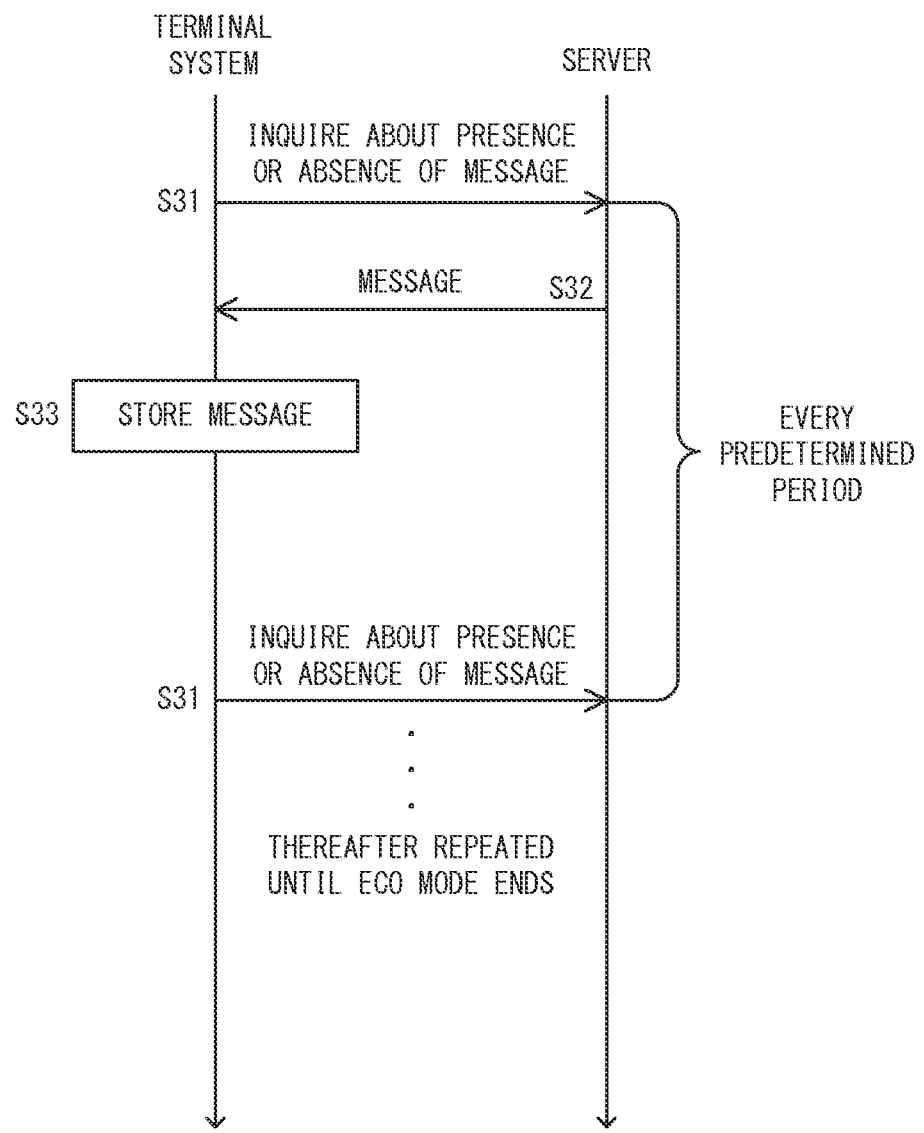
FIG. 13 is a timing chart showing an example of the flow of the processing of a message process.

FIG. 13 is a timing chart showing an example of the flow of the processing of the message process. The timing chart shown in FIG. 13 shows the flow of the message process performed in a single eco mode.

If the eco mode has been started, the terminal system 2 first determines the presence or absence of a message for the terminal system 2. That is, the terminal system 2 inquires of the server 4 about whether or not a message for the terminal system 2 is present (step S31). At this time, for example, the identification information of the terminal system 2 is transmitted to the server 4.

In accordance with the above inquiry, the server 4 determines whether or not a message for the terminal system 2 having made the inquiry is present. If a message for the terminal system 2 is present, the server 4 transmits the message to the terminal system 2 (step S32). On the other hand, although not shown in the figures, if a message for the terminal system 2 is not present, the server 4 transmits to the terminal system 2 the notification that a message is not present. In this case, the terminal system 2 does not perform the process of step S33 described later.

Having received the message from the server 4, the terminal system 2 stores the received message in the storage section 15 (step S33). It should be noted that in the present embodiment, a message is always stored in the storage section 15, and therefore, it is not necessary to start the additional storage device 3 in the message process. In another embodiment, however, a message may be stored in an additional storage device. Further, also in the message process, similarly to the update process, the terminal system 2 may determine based on the storage content of the additional storage device 3 acquired in advance whether or not to store the message in the additional storage device 3 (whether or not to start the additional storage device 3).

In the present embodiment, the message process (the processes of steps S31 to S33) is periodically repeated during a single eco mode (see FIG. 13). That is, the terminal system 2 repeats the message process at intervals of a predetermined time (an hour, for example). In the present embodiment, the terminal system 2 ends the eco mode under the condition that the update process and the addition process have been completed. That is, the message process is repeatedly performed at the predetermined time intervals while either of the update process and the addition process is continuing.

As described above, in the present embodiment, in the eco mode, the terminal system 2 acquires a message from an external apparatus (the server 4) via the network 5 and stores the acquired message. Thus, in the present embodiment, the terminal system 2 can receive a message during the eco mode where the user is not using the terminal system 2. As described above, the execution of the message process during the eco mode makes it possible to reduce the processing performed during the full mode. Further, the user can receive a message insidiously.

(4-4-4: Parallel Processing of Tasks in Communication Process)

As described above, in the communication process during the eco mode, the above three processes (the update process, the addition process, and the message process) are performed. In the present embodiment, the terminal system 2 processes the tasks of these three processes (the processes of the steps in FIGS. 11 to 13) in parallel.

Specifically, if the eco mode has been started, first, the terminal system 2 sequentially performs the processes of steps S11, S21, and S31, each of which is the process of inquiring of the server 4. Then, having received data transmitted from the server 4 in accordance with the inquiry, the terminal system 2 performs processing based on the received data. That is, if update information has been received, the processes of steps S13 to S18 in the update process are performed. If data of an additional application has been received, the processes of steps S23 to S25 in the addition process are performed. If a message has been received, the process of step S33 in the message process is performed.

It should be noted that if, in the update process and the addition process, data is downloaded from the server 4, and processing using the data (the process of updating and adding an application) is performed, it may take a relatively long time. On the other hand, as described above, the message process is repeatedly performed in a single eco mode (see FIG. 13). Thus, while the update process and the addition process are being performed, the timing of performing the message process may arrive again. In this case, the terminal system 2 performs the message process again while the update process and the addition process are being performed.

As described above, in the eco mode, the terminal system 2 can perform two different types of processes. The first type of process is a process (the update process and the addition process) in which the eco mode ends at least under the condition that the process has been completed. Further, the second type of process is a process (the message process) which is performed in parallel with the first type of process and repeatedly performed until the eco mode ends. Based on the above, it is possible to certainly complete the first type of process during the eco mode, and perform the second type of process at an appropriate frequency. For example, a process that is preferably performed at the same intervals as the start interval between the eco modes and a process that is preferably performed at shorter intervals than the start interval between the eco modes may both be performed in the communication process. In this case, the former process may be regarded as the first type of process, and the latter process may be regarded as the second type of process. This makes it possible to perform both types of processes at appropriate intervals. It should be noted that the terminal system 2 may perform three or more types of processes in parallel.

(4-4-5: Operation when Operation Mode Shifts to Full Mode During Eco Mode)

As described above, in the present embodiment, the full mode starts in accordance with a start instruction from the user. Thus, if a start instruction has been given during the eco mode, the operation mode of the terminal system 2 shifts from the eco mode to the full mode. At this time, after the operation mode has shifted to the full mode, the terminal system 2 continues to perform the communication process that was being performed during the eco mode. The details are described below.

Figure 14:
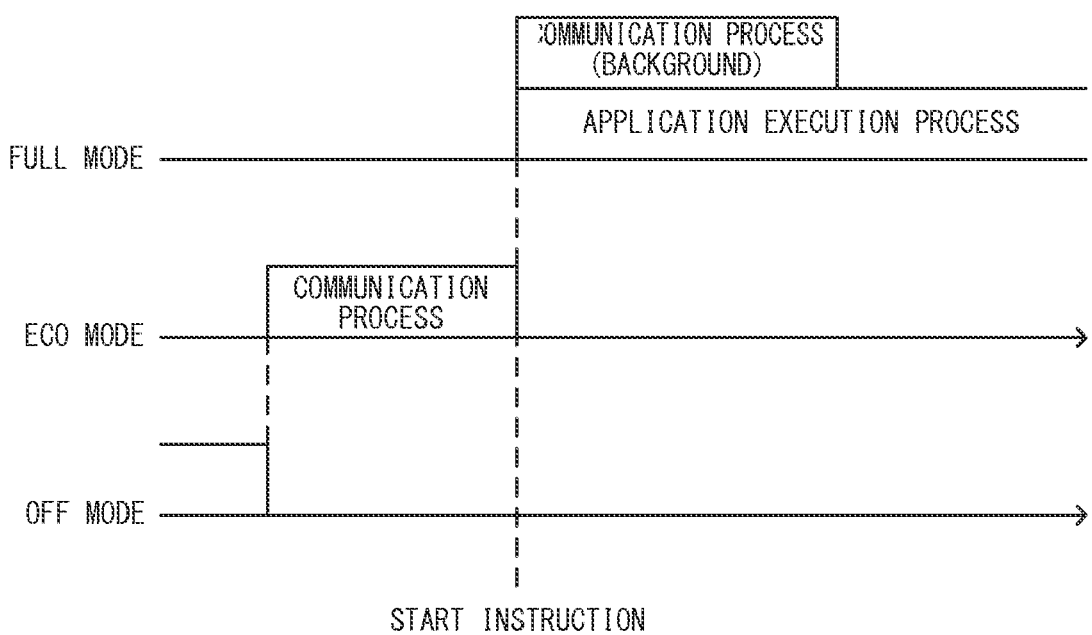
FIG. 14 is a diagram showing an example of the transition of the operation mode when the eco mode shifts to the full mode.

FIG. 14 is a diagram showing an example of the transition of the operation mode when the eco mode shifts to the full mode. As shown in FIG. 14, if a start instruction has been given by the user in the eco mode, the terminal system 2 shifts to the full mode. At this time, the terminal system 2 suspends the communication process that was being performed in the eco mode, and stores information required to resume the communication process in the storage section 15. For example, if data was being received from the server 4 in the update process or the addition process, the reception process is suspended. Alternatively, for example, if the process of updating or adding (installing) an application was being performed in the update process or the addition process, the process is suspended. Then, the terminal system 2 ends the eco mode and starts the full mode. It should be noted that in another embodiment, when the eco mode shifts to the full mode, the terminal system 2 (the second processing unit 22) may continue to perform the communication process without suspending it.

After having shifted to the full mode, the terminal system 2 performs the application execution process in the full mode. Further, the terminal system 2 resumes at appropriately timing the communication process that was being performed in the eco mode (see FIG. 14). It should be noted that FIG. 14 shows that the communication process is resumed simultaneously with the start of the full mode. The timing of resuming the communication process, however, is any timing. When resuming the communication process, the terminal system 2 does not need to resume the communication process from the processing at the time of the suspension, and may resume in the full mode a part of the processing performed during the eco mode. Alternatively, if a single message process has been completed during the eco mode, the terminal system 2 does not need to newly perform the message process during the full mode. If the communication process resumed in the full mode has been completed, the terminal system 2 ends the communication process.

It should be noted that in another embodiment, also during the full mode, the terminal system 2 may perform (start performing) a communication process similar to the communication process during the eco mode. At this time, the communication process may be performed periodically (or in accordance with a predetermined time schedule) during the full mode. It should be noted that the frequency at which the eco mode is started and the communication process is performed may be the same as or different from the frequency at which the communication process is performed during the full mode.

As described above, in the present embodiment, in accordance with the fact that a predetermined condition has been satisfied in the eco mode (a start instruction has been given), the terminal system 2 shifts the operation mode to the full mode. Here, if the operation mode has shifted to the full mode while the information processing in the eco mode was being performed (the communication process), the terminal system 2 continuously performs in the full mode the information processing that was being performed (see FIG. 14). This makes it possible to, even if the operation mode has shifted to the full mode during the eco mode, complete the communication process without wasting the processing performed during the eco mode. Thus, it is possible to efficiently perform the communication process during the eco mode.

Further, in the present embodiment, when performing the communication process (the communication process that was being performed in the eco mode, and/or the communication process to start to be performed in the full mode) during the full mode, the terminal system 2 performs the communication process in the background (see FIG. 14).

That is, during the communication process, the terminal system 2 does not provide an output regarding the communication process and does not notify the user that the communication process is being performed. This enables the user to use the terminal system 2 similarly to normal (when the off mode has shifted to the full mode) without being concerned about the communication process.

It should be noted that even when performing the communication process in the background as in the present embodiment, the terminal system 2 may give a notification to the user in accordance with the completion of the communication process in the full mode. Here, if the communication process has been completed during the eco mode, the terminal system 2 gives a notification of the result of the communication process in the subsequent full mode. For example, after the start of the full mode, the message "an updated application is present" or the message "a new application has been added" is displayed. Even if the communication process has been completed in the full mode, the terminal system 2 may display, for example, a message similar to the above. This makes it possible to notify the user of the result of the communication process even if the communication process has been completed during the full mode.

Further, instead of performing the communication process in the background always during the full mode, the terminal system 2 may perform the communication process in the background when an application is being executed. For example, if an application is not being executed and the menu screen is displayed on the display section 13, the terminal system 2 may display an image indicating the progress situation of the communication process together with the menu screen. This enables the user to perform an operation without being concerned about the communication process when using an application, and also to confirm the situation of the communication process when not using an application.

Further, in another embodiment, the terminal system 2 may not perform the communication process in the background during the full mode. For example, the terminal system 2 may notify the user that the communication process is being performed, or may display the processing situation of the communication process in real time.

(4-5: Shift from Off Mode to Another Mode)

Figure 15:
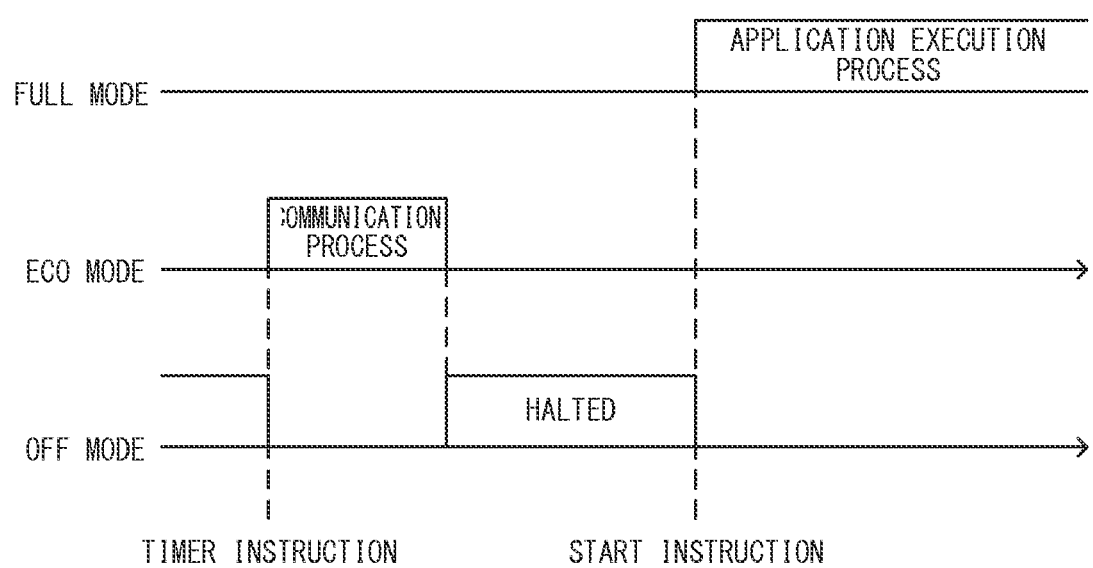
FIG. 15 is a diagram showing an example of the transition of the operation mode when an off mode shifts to another mode.

FIG. 15 is a diagram showing an example of the transition of the operation mode when the off mode shifts to another mode. As described above, when the terminal system 2 operates in the off mode, the operation mode shifts to the eco mode periodically. Further, as shown in FIG. 15, in accordance with the fact that a start instruction has been given by the user in the off mode, the operation mode shifts to the full mode. It should be noted that it can be said that in the present embodiment, a condition for shifting from the off mode to the eco mode is a condition to be satisfied in accordance with the lapse of time (periodically), whereas a condition for shifting from the off mode to the full mode is a condition to be satisfied independently of the lapse of time (irregularly).

As described above, in the off mode, in accordance with the fact that a predetermined condition different from a condition for shifting to the eco mode has been satisfied (a start instruction has been given), the terminal system 2 shifts the operation mode to the full mode. This makes it possible to shift the operation mode to the full mode even during the off mode.

Specifically, in the off mode, under the condition that predetermined timing that periodically arrives has come, the terminal system 2 shifts the operation mode to the eco mode, and under the condition that a start instruction has been given by the user, the terminal system 2 shifts the operation mode to the full mode. This makes it possible to, in the off mode, shift the operation mode to the eco mode periodically, and also shift to the full mode at the timing desired by the user.

Further, in the present embodiment, either during the off mode or during the eco mode, the terminal system 2 shifts the operation mode to the full mode in accordance with the fact that a predetermined condition has been satisfied (a start instruction has been given). This enables the user to shift the operation mode to the full mode at desired timing without being aware of the off mode and the eco mode.

(4-6: Operation of Control Section when Mode Shifts Between Off Mode and Another Mode)

Next, a description is given of the details of the operation of the control section 14 when the mode shifts between the off mode and another mode. In the present embodiment, when the mode shifts to the off mode, the second processing unit 22 gives an instruction to the power source control unit 23, whereby the second processing unit 22 itself halts the operation. Then, in the off mode, the power source control unit 23 operates to manage the shift to another mode. This makes it possible to halt the second processing unit 22 in the off mode and save power. The details are described below.

(Case where Full Mode Shifts to Off Mode)

If an end instruction as described above has been given in the full mode, the first processing unit 21 ends the operation. Further, the second processing unit 22 performs the process for ending the full mode. This process includes the process of ending the OS, and the process of storing the connection information described above. Further, the second processing unit 22 notifies the power source control unit 23 of information regarding the shift time until the second processing unit 22 starts next, and then ends the operation. In the present embodiment, the shift time information indicates the time between when the current eco mode ends and when the second processing unit 22 starts next (a next start time). It should be noted that the shift time information may be any information that allows the specifying of the timing of starting the next eco mode. For example, the shift time information may indicate the time when the eco mode next is to be started. Consequently, the operation mode shifts from the full mode to the off mode. It should be noted that if the full mode shifts to the off mode, the next start time is the time t1 shown in FIG. 5. The time t1 is stored in advance in the storage section 15, and the second processing unit 22 acquires information indicating the time t1 from the storage section 15, and notifies the power source control unit 23 of the information. In accordance with the notification from the second processing unit 22, the power source control unit 23 stores the next start time and starts measuring time using the RTC. Further, the power source control unit 23 stops supplying power to the components of the terminal system 2 (including the first processing unit 21 and the second processing unit 22) (see FIG. 3).

(Case where Off Mode Shifts to Eco Mode)

Figure 16:
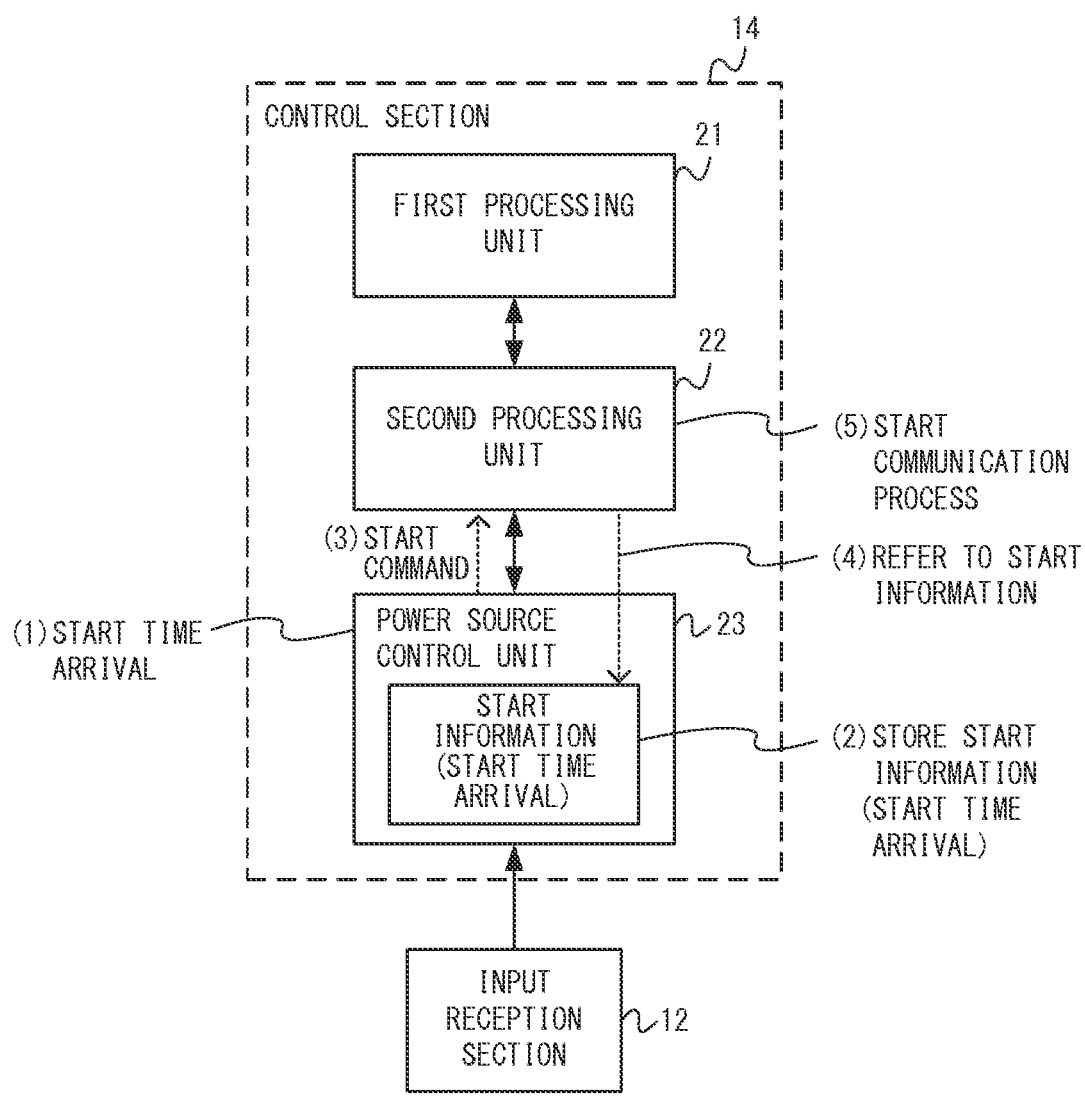
FIG. 16 is a diagram showing the operation of the control section 14 when the off mode shifts to the eco mode.

FIG. 16 is a diagram showing the operation of the control section 14 when the off mode shifts to the eco mode. As described above, in the off mode, the power source control unit 23 measures the time from the start of the off mode. Then, if the measured time has reached the next start time notified by the second processing unit 22 when a shift has been made to the off mode ((1) shown in FIG. 16), first information indicating that the start time has arrived is stored as start information ((2) shown in FIG. 16).

Here, the start information is information indicating the cause for the start when another mode starts from the off mode. In the present embodiment, the above first information indicating that the next start time has been reached or second information (described later) indicating that a start instruction has been given is stored as the start information. The start information may have any content that allows the determination of whether the off mode is to shift to the full mode or shift to the eco mode. For example, the start information may be information indicating the transmission destination of a signal that gives the start instruction (whether the input reception section 12 or the RTC in the power source control unit 23 in the present embodiment).

In accordance with the fact that the measured time has reached the next start time, the power source control unit 23 starts supplying power to the second processing unit 22 and transmits a start command to the second processing unit 22 ((3) shown in FIG. 16). In accordance with the start command, the second processing unit 22 starts. Having started, the second processing unit 22 refers to the start information stored in the power source control unit 23 ((4) shown in FIG. 16). It should be noted that in another embodiment, the power source control unit 23 may notify the second processing unit 22 of the start information.

Here, when the off mode shifts to the eco mode, the start information is the first information indicating that the next start time has been reached. If the first information is thus stored as the start information, the second processing unit 22 determines that a shift is to be made to the eco mode. Then, the second processing unit 22 starts the process in the eco mode ((5) shown in FIG. 16). Specifically, the second processing unit 22 instructs the power source control unit 23 to supply power to the components that operate in the eco mode. Further, the second processing unit 22 starts performing the communication process (the setting process in the end-time eco mode).

(Case where Eco Mode Shifts to Off Mode)

If the process in the eco mode (the communication process) has been completed, the second processing unit 22 notifies the power source control unit 23 of the next start time and ends the operation. This results in shifting from the eco mode to the off mode. It should be noted that if the eco mode shifts to the off mode, the next start time is the start interval between the eco modes (the time t2 shown in FIG. 5). The time t2 is stored in advance in the storage section 15 in the full mode, and the second processing unit 22 acquires information indicating the time t2 from the storage section 15, and notifies the power source control unit 23 of the information. In accordance with the notification from the second processing unit 22, the power source control unit 23 stores the next start time and starts measuring time using the RTC. Further, the power source control unit 23 stops supplying power to the components of the terminal system 2 (including the second processing unit 22).

As described above, in the present embodiment, the terminal system 2 includes: a first processing circuit (the power source control unit 23), which is a circuit capable of measuring time and operates in the off mode; and a second processing circuit (the second processing unit 22), which is a circuit for performing information processing in the eco mode, operates in the eco mode, and does not operate in the off mode. Here, if the process in the eco mode has been completed, the second processing circuit notifies the first processing circuit of time information (the shift time information) for shifting to the eco mode next, and halts. If, in the off mode, the measured time has reached the time (the next start time) indicated by the time information notified by the second processing circuit, the first processing circuit starts the second processing circuit, thereby shifting from the off mode to the eco mode. Based on the above, it is possible to halt in the off mode a processing circuit for performing the process in the eco mode, and save power. Further, the processing circuit for performing the process in the eco mode can easily manage the start interval between the eco modes.

(Case where Off Mode Shifts to Full Mode)

Figure 17:
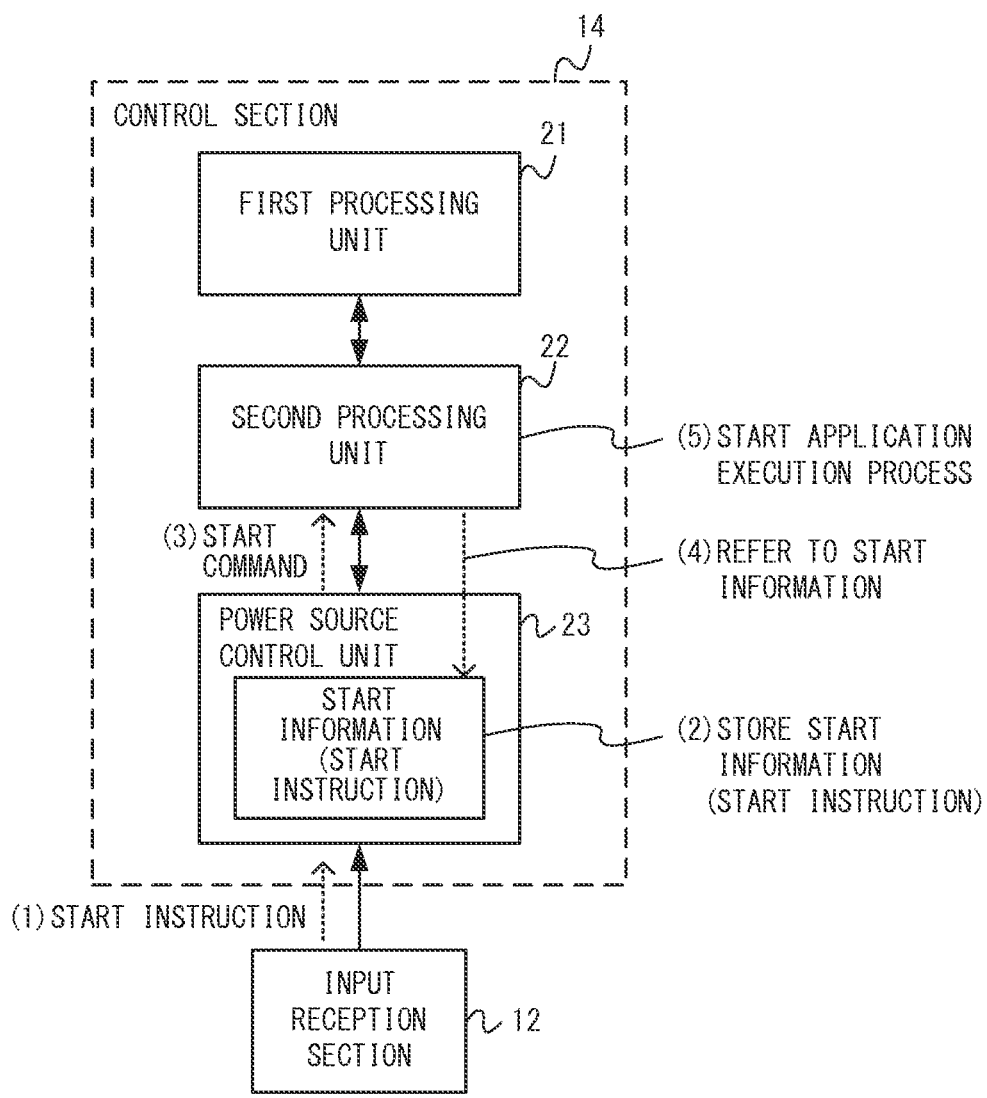
FIG. 17 is a diagram showing the operation of the control section 14 when the off mode shifts to the full mode.

FIG. 17 is a diagram showing the operation of the control section 14 when the off mode shifts to the full mode. If a start instruction as described above has been given in the off mode, the input reception section 12 notifies the power source control unit 23 that a start instruction has been given ((1) shown in FIG. 17). Having received the notification, the power source control unit 23 stores, as the start information, second information indicating that a start instruction has been given ((2) shown in FIG. 17). For example, if a start instruction can be given using a plurality of switches (for example, a switch provided in the body of the terminal system 2 and a switch provided in a controller different from the body), the second information may be information identifying the switch used to give the start instruction.

Further, if having received the notification from the input reception section 12, the power source control unit 23 starts supplying power to the second processing unit 22 and transmits a start command to the second processing unit 22 ((3) shown in FIG. 17). In accordance with the start command, the second processing unit 22 starts. Having started, the second processing unit 22 refers to the start information stored in the power source control unit 23 ((4) shown in FIG. 17). Here, when the off mode shifts to the full mode, the start information is the second information indicating that the start instruction has been given. If the second information is thus stored as the start information, the second processing unit 22 determines that a shift is to be made to the full mode. Then, the second processing unit 22 starts the process in the full mode (the application execution process) ((5) shown in FIG. 17). Specifically, the second processing unit 22 instructs the power source control unit 23 to supply power to the components (including the first processing unit 21) that operate in the full mode. Further, the second processing unit 22 starts the first processing unit 21 and executes the OS.

As described above, in the present embodiment, the terminal system 2 operates in the off mode, includes a timer circuit (RTC) capable of measuring time, and manages a time schedule regarding the shift of the operation mode using the timer circuit. Based on this, the timer circuit may start in the off mode, and it is possible to halt other circuits where necessary. This makes it possible to manage the time schedule while saving power.

It should be noted that when the eco mode shifts to the full mode, the control section 14 operates as follows. That is, if having received a notification from the input reception section 12, the power source control unit 23 notifies the second processing unit 22 that a start instruction has been given. In accordance with the notification, similarly to the case where the off mode shifts to the full mode (see (5) shown in FIG. 17), the second processing unit 22 starts the process in the full mode (the application execution process).

[5. Specific Examples of Processing of Terminal System]

Figure 18:
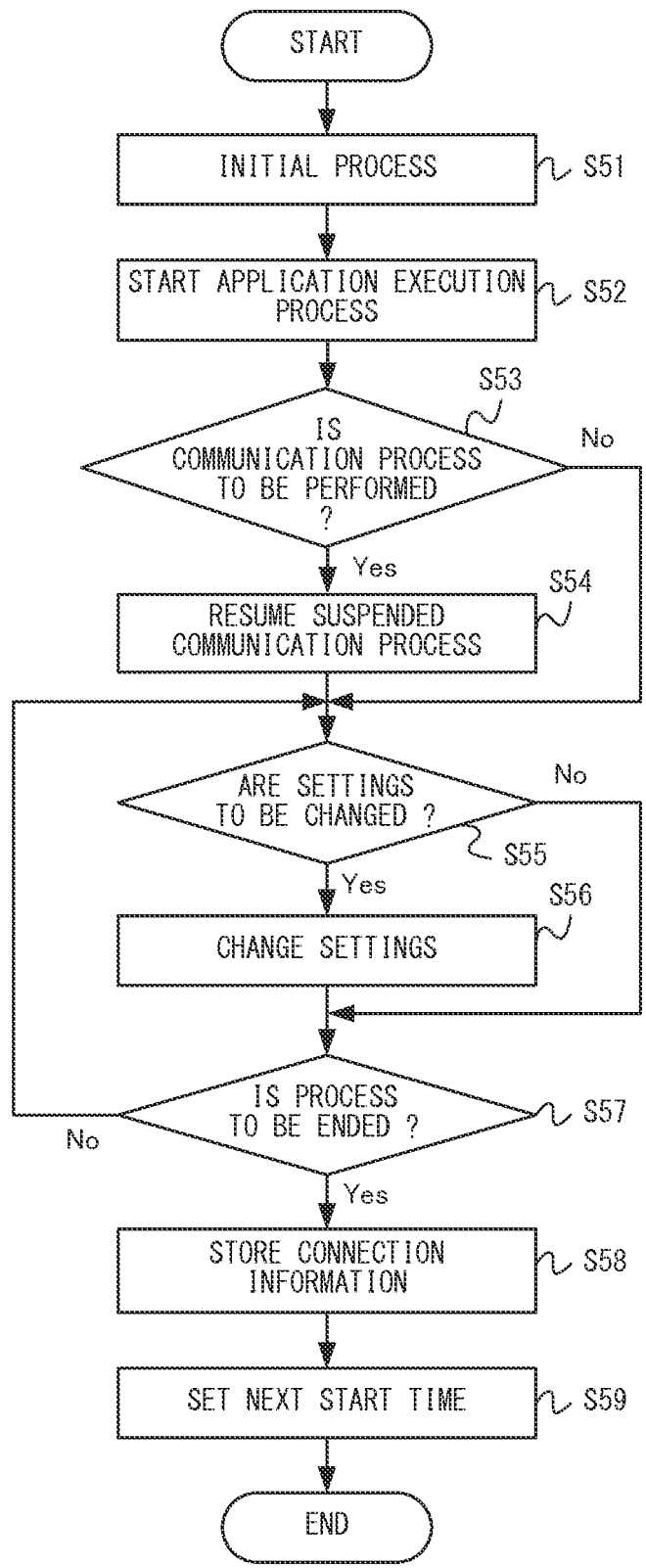
FIG. 18 is a flow chart showing an example of the flow of the processing performed by the control section 14 of the terminal system 2 during the full mode.

A description is given of specific examples of the processing performed in the terminal system 2 in the present embodiment. FIG. 18 is a flow chart showing an example of the flow of the processing performed by the control section 14 of the terminal system 2 during the full mode. In the present embodiment, a series of processes shown in FIG. 18 are performed by the CPU of the second processing unit 22 of the control section 14 executing the information processing program (system software) stored in the storage section 15. The series of processes shown in FIG. 18 are started in accordance with the start of the full mode.

In the full mode, first, in step S51, the CPU performs an initial process. The initial process is, for example, the process of initializing a memory area (a part of the storage section 15 or a memory of the second processing unit 22) to be used in the process during the full mode.

In the subsequent step S52, the CPU starts the application execution process. The application execution process is the process of executing an application in accordance with an instruction from the user. For example, the CPU displays the menu screen including icons of executable applications on the display section 13, and executes an application specified by the user. At this time, also the CPU of the first processing unit 21 is used to execute the application. In the full mode, after the process of step S52, the application execution process is performed until it is determined in step S57 that the process in the full mode is to end.

In step S53, the CPU determines whether or not to perform the communication process. As described above, if the eco mode has shifted to the full mode, the communication process during the eco mode may have been suspended. The CPU determines whether or not the communication process in the last eco mode has been suspended. If the result of the determination in step S53 is affirmative, the process of step S54 is performed. If, on the other hand, the result of the determination in step S53 is negative, the process of step S54 is skipped, and the process of step S55 is performed.

In step S54, the CPU starts (resumes) performing the suspended communication process. That is, as described above in "(4-4-5: Operation When Operation Mode Shifts to Full Mode during Eco Mode)", the CPU performs the communication process that has been suspended. In the present embodiment, after the process of step S54, the communication process is performed in the background until the communication process is completed.

In step S55, the CPU determines whether or not to change the start interval between the eco modes. That is, it is determined whether or not to display a setting change screen for changing various settings including the start interval between the eco modes. The determination is made based on whether or not a predetermined instruction has been given by the user. If the result of the determination in step S55 is affirmative, the process of step S56 is performed. If, on the other hand, the result of the determination in step S55 is negative, the process of step S56 is skipped, and the process of step S57 is performed.

In step S56, the CPU changes the settings in accordance with an input from the user. That is, as described above in "(4-3: Start Interval between Eco Modes)", the start interval between the eco modes is changed in accordance with an input from the user. The CPU stores data representing the changed start interval in the storage section 15.

In step S57, the CPU determines whether or not to end the process in the full mode. That is, the CPU determines whether or not the ending condition described above has been satisfied by the user. If the result of the determination in step S57 is affirmative, the process of step S58 is performed. If, on the other hand, the result of the determination in step S57 is negative, the process of step S55 is performed again.

In step S58, the CPU stores the connection information. The connection information is acquired as described above in "(Storage of Connection Information)" and is stored in the storage section 15. It should be noted that at this time, the CPU performs the process for ending the full mode, such as ending executing the OS.

In step S59, the CPU sets the next start time described above. That is, the power source control unit 23 is notified of the next start time by the method described above in "(4-6: Operation of Control Section When Mode Shifts between Off Mode and Another Mode)". After step S59, the CPU ends the process in the full mode.

Figure 19:
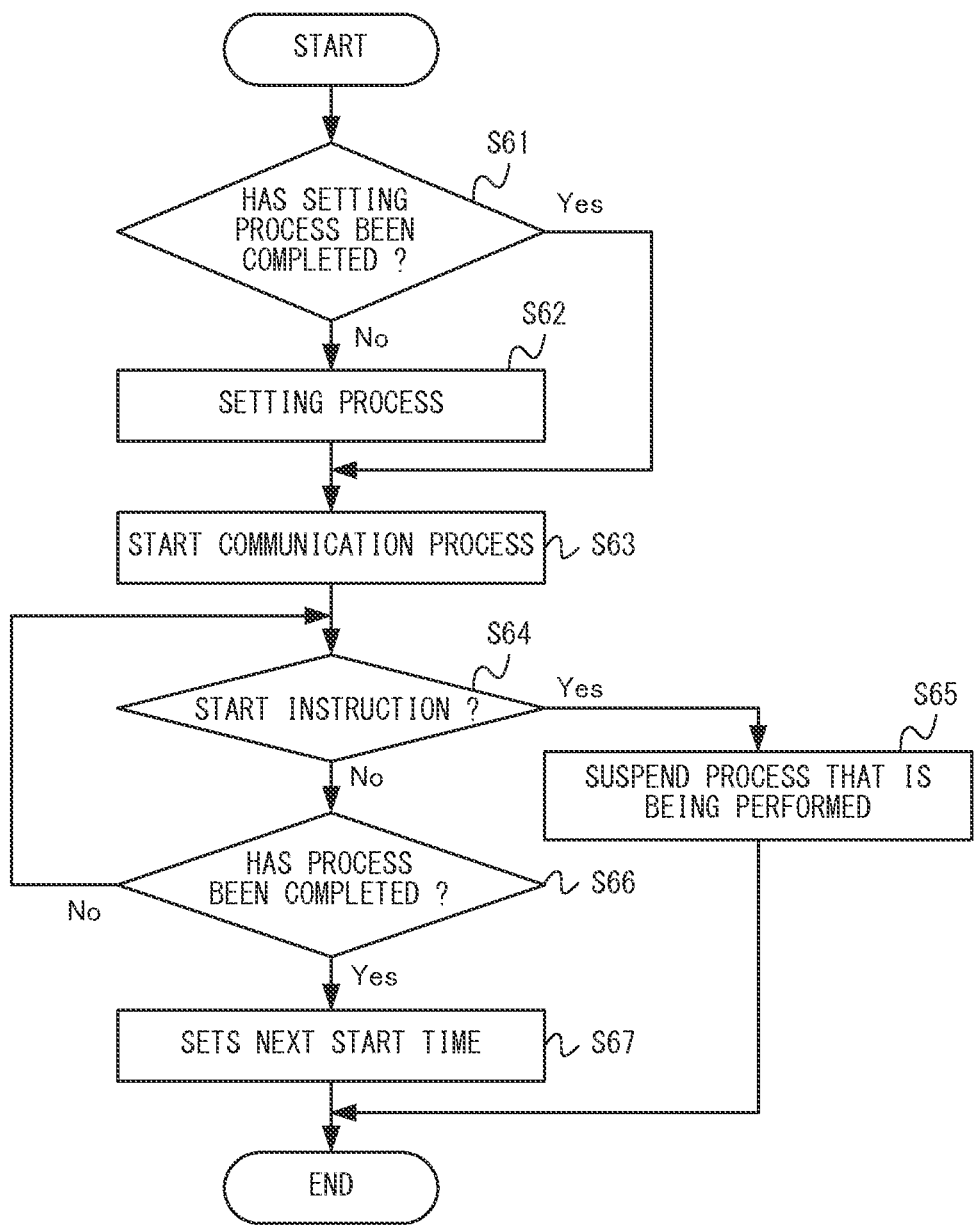
FIG. 19 is a flow chart showing an example of the flow of the processing performed by the control section 14 of the terminal system 2 during the eco mode.

FIG. 19 is a flow chart showing an example of the flow of the processing performed by the control section 14 of the terminal system 2 during the eco mode. In the present embodiment, a series of processes shown in FIG. 19 are performed by the CPU of the second processing unit 22 of the control section 14 executing the information processing program (system software) stored in the storage section 15. The series of processes shown in FIG. 19 are started in accordance with the start of the eco mode.

In the eco mode, first, in step S61, the CPU determines whether or not the setting process described above has been completed. The determination can be made based on, for example, whether or not the storage content of the additional storage device 3 acquired in the setting process is stored in the storage section 15. If the result of the determination in step S61 is affirmative, the process of step S62 is skipped, and the process of step S63 is performed. If, on the other hand, the result of the determination in step S61 is negative, the process of step S62 is performed.

In step S62, the CPU performs the setting process. The setting process is performed by the method described above in "(4-2: End-Time Eco Mode)". If the setting process has ended, the CPU performs the process of step S63.

In step S63, the CPU starts the communication process. The communication process is performed by the method described above in "(4-4: Communication Process in Eco Mode)". After the process of step S63, the communication process is performed in the eco mode.

In step S64, the CPU determines whether or not a start instruction has been given by the user. If the result of the determination in step S64 is affirmative, the process of step S65 is performed. If, on the other hand, the result of the determination in step S64 is negative, the process of step S66 is performed.

In step S65, the CPU suspends the communication process that is being performed. The specific operation of suspending the communication process is described above in "(4-4-5: Operation When Operation Mode Shifts to Full Mode during Eco Mode)". After step S65, the CPU ends the process during the eco mode. At this time, the operation mode shifts from the eco mode to the full mode.

On the other hand, in step S66, the CPU determines whether or not the communication process has been completed. That is, the CPU determines whether or not the update process, the addition process, and the message process described above have been completed. If the result of the determination in step S66 is affirmative, the process of step S67 is performed. If, on the other hand, the result of the determination in step S66 is negative, the process of step S64 is performed again.

In step S67, the CPU sets the next start time described above. That is, the power source control unit 23 is notified of the next start time by the method described above in "(4-6: Operation of Control Section When Mode Shifts between Off Mode and Another Mode)". After step S67, the CPU ends the process in the eco mode. At this time, the operation mode shifts from the eco mode to the off mode.

It should be noted that the processes of all the steps in the flow charts shown in FIGS. 18 and 19 are merely illustrative. Thus, the processing order of the steps may be changed, or another process may be performed in addition to (or instead of) the processes of all the steps, so long as similar results are obtained. Further, in the present embodiment, descriptions are given on the assumption that a CPU performs the processes of all the steps in the flow charts. Alternatively, a processor or a dedicated circuit other than the CPU may perform the processes of some of the steps in the flow charts.

In accordance with the shift of the operation mode, the CPU of the second processing unit 22 performs the series of processes in the full mode or the eco mode shown in FIGS. 18 and 19. It should be noted that as described above, in the off mode, the power source control unit 23 operates, and the second processing unit 22 is halted.

[6. Variations]

(Variations of Supply of Power in Each Mode)

It can be said that in the above embodiment, each mode is in the following state.
(a) Full mode: at least the first processing unit starts.
(b) Eco mode: less power is consumed than in the full mode, the first processing unit 21 does not start, and the second processing unit 22 starts.
(c) Off mode: the first processing unit 21 and the second processing unit 22 do not start, and the power source control unit starts.

The state of each mode is set as described above, whereby it is possible to save power in the terminal system 2 as described above. Here, in the present embodiment, in the full mode, the units 21 to 23 of the control section 14 start, and in the eco mode, the processing units 21 and 22 of the control section 14 start. It should be noted that in another embodiment, in the full mode, at least the first processing unit may start, and the second processing unit 22 and/or the power source control unit 23 may not start. Alternatively, in the eco mode, the power source control unit 23 may not start. Even in this case, similarly to the above embodiment, it is possible to save power in the terminal system 2.

(Variations of Configuration of Control Section)

In the above embodiment, in the full mode, the first processing unit 21 and the second processing unit 22 operate, and in the eco mode, the second processing unit 22 operates. That is, the process in the eco mode is performed using a part of the processing circuit (the CPU of the second processing unit 22) that operates in the full mode. Here, in another embodiment, the process in the eco mode may be performed by a dedicated processing circuit.

FIG. 20 is a diagram showing an example of a variation of the configuration of the control section. As shown in FIG. 20, the control section 14 may include a full mode processing unit 51, an eco mode processing unit 52, and a power source control unit 23 similar to that according to the above embodiment. The full mode processing unit 51 is an information processing circuit for performing the process in the full mode. That is, in the full mode, the full mode processing unit 51 executes the OS and executes an application specified by the user. The eco mode processing unit 52 is an information processing circuit for performing the process in the eco mode. That is, the eco mode processing unit 52 performs the setting process and the communication process described above.

When the control section 14 is configured as shown in FIG. 20, if the off mode shifts to the full mode, the power source control unit 23 transmits a start command to the full mode processing unit 51 (see FIG. 20). Further, if the full mode shifts to the off mode, the full mode processing unit 51 ends the process in the full mode, then notifies the power source control unit 23 of the next start time (the time t1), and ends the operation.

If, on the other hand, the off mode shifts to the eco mode, the power source control unit 23 transmits a start command to the eco mode processing unit 52 (see FIG. 20). Further, if the eco mode shifts to the off mode, the eco mode processing unit 52 ends the process in the eco mode, then notifies the power source control unit 23 of the next start time (the time t2), and ends the operation.

Further, if the eco mode shifts to the full mode, in accordance with the fact that a start instruction has been given, the power source control unit 23 transmits a start command to the full mode processing unit 51. Thus, the full mode processing unit 51 starts performing the process in the full mode, and the operation mode shifts to the full mode. Further, in accordance with the fact that a start instruction has been given, the power source control unit 23 notifies the eco mode processing unit 52 that a start instruction has been given. The eco mode processing unit 52, however, does not immediately end the process in the eco mode (the communication process) even if having received the notification, and continues to perform the process. Then, if the process has been completed, the operation is ended. This makes it possible to, even if the eco mode shifts to the full mode similarly to the above embodiment, complete the process in the eco mode.

(Variations of Time Interval Between Eco Modes)

In the above embodiment, the user can set the time interval (the start interval) between the eco modes. Here, in another embodiment, the server 4 may set the start interval between the eco modes for the terminal system 2. That is, when the control section 14 communicates with the server 4 via the network 5 in the eco mode, the server 4 may notify the terminal system 2 of information (the shift time information) indicating the time when the eco mode starts next to the current eco mode. It should be noted that the shift time information may be information that allows the specifying of the timing of starting the next eco mode. For example, the shift time information may indicate the time from the end of the current eco mode, or may indicate the time when the eco mode is to be started next.

As described above, in the eco mode, the terminal system 2 may acquire via a network the shift time information indicating the time when the operation mode shifts to the eco mode next. At this time, after having acquired the shift time information, the terminal system 2 determines based on the shift time information the time when the off mode shifts to the eco mode next. For example, if the shift time information indicates the time from the end of the current eco mode, the power source control unit 23 may start the next eco mode when the time measured by the RTC has become the time indicated by the shift time information.

As described above, when the server 4 sets the start interval between the eco modes, a software provider can set the start interval. For example, a software provider can make the start interval long if an update or addition of software is not present, or can make the start interval short if many pieces of software that need to be updated or added are present. This makes it possible to set the start interval between the eco modes to an appropriate length.

(Variations of Start of Eco Mode)

In the above embodiment, a description has been given on the premise that the eco mode is started periodically (or the eco mode is started in accordance with a time schedule). Here, in another embodiment, the eco mode may not be started periodically, or may not be started in accordance with a time schedule. Even in this case, for example, in the eco mode, the terminal system 2 determines based on the storage content of the additional storage device 3 acquired in advance whether or not to start the additional storage device 3. This makes it possible to reduce the power consumption during the eco mode, and reduce the driving sound produced in the eco mode. Further, for example, in the eco mode, based on the result of the determination of whether or not to access the additional storage device 3, the terminal system 2 determines whether or not to start the additional storage device 3. This makes it possible to reduce the power consumption during the eco mode, and reduce the driving sound produced in the eco mode.

Further, in the present embodiment, the apparatus of which the start is controlled in the eco mode is the additional storage device 3. Alternatively, another embodiment is not limited to this. For example, in another embodiment, the terminal system 2 may control the start of a storage device included in the terminal system 2 (built into the terminal system 2). Specifically, if the storage section 15 includes a semiconductor storage device (a NAND flash memory, for example) and a disk storage device (a hard disk, for example), the terminal system 2 may control the start of the hard disk. As in the above embodiment and the above variation, the start of the storage device that produces a driving sound is controlled, whereby it is possible to reduce noise during the eco mode.

It should be noted that also in the above variation, similarly to the above embodiment, it may be determined based on the storage content of the storage device whether or not to start the storage device. That is, in the eco mode, the terminal system 2 may determine based on the storage content, acquired in advance, of the storage device accessible by the terminal system 2 (the storage section 15 in the above variation or the additional storage device 3 in the above embodiment) whether or not to start the storage device. This enables the terminal system 2 to provide an opportunity where the storage device is not started depending on the storage content of the storage device. This makes it possible to reduce the power consumption during the eco mode.

Further, the apparatus of which the start is controlled in the eco mode may be not only a storage device but also any additional device capable of connecting to the terminal system 2. For example, in another embodiment, if a display device or a loudspeaker is connected as an additional device to the terminal system 2, the terminal system 2 may control the start of the additional device in the eco mode. It should be noted that also in this case, similarly to the above embodiment, it may be determined based on data acquired from an external apparatus (the server 4) via the network 5 whether or not to start the additional device. That is, the terminal system 2 acquires data from an external apparatus (the server 4) via a network and determines whether or not it is necessary to access the additional device for processing regarding the acquired data. Then, based on the result of the determination of whether or not it is necessary to access the additional device, the terminal system 2 may determine whether or not to start the additional device. For example, if the acquired data is an important message for the user, it may be determined that it is necessary to access the display device or the loudspeaker (in order to notify the user of the message), and the display device or the loudspeaker may be started. The start of the additional device is thus controlled, whereby it is possible to reduce the power consumption during the eco mode.

INDUSTRIAL APPLICABILITY

As described above, the above embodiment can be used as an information processing system (a game system), an information processing program, and the like that execute various applications, in order, for example, to save power.

DESCRIPTION OF THE REFERENCE CHARACTERS

1 communication system
2 terminal system
3 additional storage device
4 server
5 network
11 communication section
12 input reception section
13 display section
14 control section
15 storage section
16 cooling fan
21 first processing unit
22 second processing unit
23 power source control unit
51 full mode processing unit 51
52 eco mode processing unit 52

The invention claimed is:

1. An information processing system capable of communicating with an external apparatus via a network, the information processing system capable of operating in at least three operation modes including: (a) a first mode, where at least a first processor configured to execute an application in accordance with an operation of a user starts; (b) a second mode, which consumes less power than the first mode and where the first processor is powered off, and a second processor configured to automatically perform a communication process via the network starts; and (c) a third mode, where the first processor and the second processor are powered off, and a power source control circuit configured to measure time and control the start of the second processor based on the measured time starts, the information processing system comprising a processing system, the processing system being configured to:

shift the operation mode to the second mode periodically or in accordance with a predetermined time schedule when the information processing system operates in the third mode; and cause the information processing system to start performing a communication process to acquire a new application via the network and to install the acquired new application while operating in the second mode;

wherein when a predetermined condition becomes satisfied while operating in the second mode, the operation mode of the information processing system is shifted to the first mode, and if the communication process has started during operating in the second mode and the operation mode is shifted from the second mode to the first mode while the communication process in the second mode is being performed, the information processing system continues to perform the communication process in the first mode.

2. The information processing system according to claim 1, wherein whenever the information processing system is performing a communication process via the network in the second mode, if the second mode is changed to the first mode while the communication process is being performed, the communication process is temporarily suspended during the mode change and then immediately continues to be performed in the first mode.

3. An information processing system capable of communicating with an external apparatus via a network, the information processing system capable of operating in at least three operation modes including: a first mode; a second mode, which operates as an intermediate power consumption mode and which consumes less power than the first mode but more power than other modes; and a third mode, which consumes less power than the second mode but during which a communication via the network is not performed, the information processing system comprising one or more processors, the one or more processors being configured to:

shift the operation mode to the second mode periodically or in accordance with a predetermined time schedule when the information processing system operates in the third mode; and cause the information processing system to start performing a communication process to acquire a new application via the network and to install the acquired new application while operating in the second mode;

wherein when a predetermined condition becomes satisfied while operating in the second mode, the operation mode of the information processing system is shifted to the first mode, and if the communication process has started during operating in the second mode and the operation mode is shifted from the second mode to the first mode while the communication process in the second mode is being performed, the information processing system continues to perform the communication process in the first mode, wherein the one or more processors include a first processing circuit, which is a circuit capable of measuring time and operates in the third mode, and a second processing circuit, which is a circuit for performing information processing in the second mode, operates in the second mode, and does not operate in the third mode, if the information processing in the second mode has been completed, the second processing circuit notifies the first processing circuit of time information for shifting to the next second mode, and halts, and in the third mode, if the measured time has reached a time indicated by the time information notified by the second processing circuit, the first processing circuit starts the second processing circuit, thereby shifting from the third mode to the second mode.

4. An information processing apparatus capable of communicating with an external apparatus via a network, the information processing apparatus capable of operating in at least three operation modes including: (a) a first mode, where at least first processing circuit configured to execute an application in accordance with an operation of a user starts; (b) a second mode, which consumes less power than the first mode and where the first processing circuit is powered off, and second processing circuit configured to automatically perform a communication process via the network starts; and (c) a third mode, where the first processing circuit unit and the second processing circuit are powered off, and a power source control circuit configured to measure time and control the start of the second processing circuit based on the measured time starts, the information processing apparatus comprising at least one processor, the at least one processor being configured to:

shift the operation mode to the second mode periodically or in accordance with a predetermined time schedule when the information processing apparatus operates in the third mode; and cause the information processing system to start performing a communication process to acquire a new application via the network and to install the acquired new application while operating in the second mode;

wherein when a predetermined condition becomes satisfied while operating in the second mode, the operation mode of the information processing system is shifted to the first mode, and if the communication process has started during operating in the second mode and the operation mode is shifted from the second mode to the first mode while the communication process in the second mode is being performed, the information processing system continues to perform the communication process in the first mode.

5. A method of controlling an information processing system capable of communicating with an external apparatus via a network, the information processing system capable of operating in at least three operation modes including: (a) a first mode, where at least first processing circuit configured to execute an application in accordance with an operation of a user starts; (b) a second mode, which consumes less power than the first mode and where the first processing circuit is powered off, and second processing circuit configured to automatically perform a communication process via the network starts; and (c) a third mode, where the first processing circuit and the second processing circuit are powered off, and a power source control circuit configured to measure time and control the start of the second processing circuit based on the measured time starts, the method comprising:

shifting the operation mode to the second mode periodically or in accordance with a predetermined time schedule when the information processing system operates in the third mode; and causing the second processing circuit to start performing a communication process to acquire a new application via the network and to install the acquired new application while operating in the second mode;

wherein when a predetermined condition becomes satisfied while operating in the second mode, the operation mode of the information processing system is shifted to the first mode, and if the communication process has started during operating in the second mode and the operation mode is shifted from the second mode to the first mode while the communication process in the second mode is being performed, the information processing system continues to perform the communication process in the first mode.

* * * * *